(12) United States Patent
Aoki et al.

(10) Patent No.: US 11,183,857 B2
(45) Date of Patent: Nov. 23, 2021

(54) BATTERY PACK AND BATTERY SYSTEM

(71) Applicant: MAKITA CORPORATION, Anjo (JP)

(72) Inventors: Yonosuke Aoki, Anjo (JP); Tatsuki Mori, Anjo (JP)

(73) Assignee: MAKITA CORPORATION, Anjo (JP)

(*) Notice: Subject to any disclaimer, the term of this patent is extended or adjusted under 35 U.S.C. 154(b) by 104 days.

(21) Appl. No.: 16/711,743

(22) Filed: Dec. 12, 2019

(65) Prior Publication Data

US 2020/0212688 A1 Jul. 2, 2020

(30) Foreign Application Priority Data

Dec. 27, 2018 (JP) .............................. JP2018-245864

(51) Int. Cl.
*H01M 10/42* (2006.01)
*H02J 7/00* (2006.01)
*H01M 4/02* (2006.01)

(52) U.S. Cl.
CPC ......... *H02J 7/0024* (2013.01); *H01M 10/425* (2013.01); *H01M 2004/027* (2013.01); *H01M 2004/028* (2013.01); *H01M 2010/4278* (2013.01)

(58) Field of Classification Search
None
See application file for complete search history.

(56) References Cited

U.S. PATENT DOCUMENTS

2019/0260209 A1* 8/2019 Nishikawa ............... H02J 7/00

FOREIGN PATENT DOCUMENTS

WO 2018/079724 A1 5/2018

* cited by examiner

*Primary Examiner* — Wyatt P McConnell
(74) *Attorney, Agent, or Firm* — Oliff PLC

(57) ABSTRACT

A battery pack in one aspect of the present disclosure includes a first battery block, a second battery block, and a terminal portion. The terminal portion is configured to output a parallel voltage of the battery block and the second battery block connected in parallel in response to a state where a first electric working machine is connected to the terminal portion. The terminal portion is configured to output a first voltage of the first battery block and a second voltage of the second battery block individually in response to a state where a second electric working machine is connected to the terminal portion.

18 Claims, 20 Drawing Sheets

BATTERY PACK AND BATTERY SYSTEM

CROSS-REFERENCE TO RELATED APPLICATIONS

This application claims the benefit of Japanese Patent Application No. 2018-245864 filed Dec. 27, 2018 with the Japan Patent Office, the entire disclosure of which is incorporated herein by reference.

BACKGROUND

The present disclosure relates to a battery pack applicable to multiple electric working machines having different rated voltages.

A battery pack disclosed in Patent Document: WO2018/079724A1 includes multiple cell units (that is, battery blocks) and the battery pack is configured to output a low voltage by connecting the multiple cell units in parallel and output a high voltage by connecting the multiple cell units in series. Thus, the aforementioned battery pack can be applied to multiple electric devices having different rated voltages.

SUMMARY

The voltages of the multiple cell units are unequal among the cell units in some cases where the multiple cell units are connected in series and used. When the aforementioned battery pack is removed from an electric device, the multiple cell units become independent from each other. Thus, even if the voltages of the multiple cell units are unequal, such inequality cannot be solved during the storage of the battery pack.

When the battery pack is used in a state where the voltages of the multiple cell units are unequal, the battery pack may be limited its use due to a cell unit having a lower voltage. When the battery pack is charged in a state where the voltages of the multiple cell units are unequal, the charging may be stopped due to a cell unit having a higher voltage. Accordingly, when the battery pack is used in a state where the voltages of the multiple cells are unequal, the battery pack may not be efficiently used.

In one aspect of the present disclosure, it is preferable to provide a battery system that can be applied to multiple rated voltages, and equalize the voltages between multiple battery blocks.

In one aspect of the present disclosure, provided is a battery pack including a first battery block, a second battery block, and/or a terminal portion. The first battery block is configured to output a first voltage. The second battery block is configured to output a second voltage. The terminal portion is configured to be interchangeably connected to a first electric working machine or a second electric working machine. The terminal portion includes a parallel connection terminal, a first output terminal, and/or a second output terminal. The parallel connection terminal is configured to connect the first battery block to the second battery block in parallel, and is configured to electrically disconnect the first battery block from the second battery block. The first output terminal is connected to the first battery block. The second output terminal is connected to the second battery block. The first electric working machine is adapted to a first machine voltage. The first electric working machine includes a first connection terminal configured to be connected to the first output terminal and/or the second output terminal. The second electric working machine is adapted to a second machine voltage higher than the first machine voltage. The second electric working machine includes a second connection terminal configured to be connected to both the first output terminal and the second output terminal. The first output terminal connected to the second connection terminal is electrically disconnected from the second output terminal connected to the second connection terminal. The parallel connection terminal is configured to connect the first battery block to the second battery block in parallel in response to a state where the first electric working machine is connected to the terminal portion, or a state where nothing is connected to the terminal portion. The parallel connection terminal is configured to electrically disconnect the first battery block from the second battery block in response to a state where the second electric working machine is connected to the terminal portion. The terminal portion is configured to output a parallel voltage of the first battery block and the second battery block connected in parallel, in response to the state where the first electric working machine is connected to the terminal portion. The terminal portion is configured to output the first voltage of the first battery block and the second voltage of the second battery block individually in response to the state where the second electric working machine is connected to the terminal portion.

According to the battery pack in one aspect of the present disclosure, in response to a state where the first electric working machine is connected to the output terminal, the first battery block is connected to the second battery block in parallel. This enables to output, from the battery pack to the first electric working machine, a parallel voltage of the first battery block and the second battery block connected in parallel, and thus, the first electric working machine can use a relatively low parallel voltage. In response to a state where the second electric working machine is connected to the output terminal, the first battery block is electrically disconnected from the second battery block. This enables to output, from the battery pack to the second electric working machine, the first voltage of the first battery block and the second voltage of the second battery independently. Thus, the second electric working machine can freely combine and use the first voltage and the second voltage output independently. Also, by avoiding outputting the high voltage from the battery pack by connecting the first battery block to the second battery block in series in the battery pack, it is possible to simplify an insulation structure of the battery pack and reduce the size of the battery pack. Furthermore, in response to the state where nothing is connected to the terminal portion, the first battery block is connected to the second battery block in parallel. This enables to equalize the voltage of the first battery block and the voltage of the second battery block during the storage of the battery pack. Accordingly, the battery pack in one aspect of the present disclosure can be adapted to the multiple rated voltages and equalize the voltages of the multiple battery blocks.

The parallel connection terminal may include a first member and a second member. Each of the first battery block and the second battery block may include a first electrode and a second electrode. The first member is configured to be connected to and disconnected from the second member. The first member may be connected to the first electrode of the first battery block. The second member may be connected to the first electrode of the second battery block.

When the first member is connected to the second member, the first battery block connected to the first member can be connected in parallel to the second battery block connected to the second member. When the first member and the second member are disconnected, the first battery block connected to the first member can be electrically disconnected from the second battery block connected to the second member.

Each of the first battery block and the second battery block may include a first electrode and a second electrode. The parallel connection terminal may include a first parallel connection terminal connected to both the first electrode of the first battery block and the first electrode of the second battery block, and a second parallel connection terminal connected to both the second electrode of the first battery block and the second electrode of the second battery block.

By connecting the first electrode of the first battery block to the first electrode of the second battery block using the first parallel connection terminal and by connecting the second electrode of the first battery block to the second electrode of the second battery block using the second parallel connection terminal, the first battery block can be connected to the second battery block in parallel. By disconnecting the first electrode of the first battery block from the first electrode of the second battery block using the first parallel connection terminal, and by disconnecting the second electrode of the first battery block from the second electrode of the second battery block using the second parallel connection terminal, the first battery block can be independent from the second battery block.

Each of the first parallel connection terminal and the second parallel connection terminal may include a first member and a second member. The first member may be configured to be connected to and disconnected from the second member. The first member of the first parallel connection terminal may be configured to be connected to the first electrode of the first battery block. The second member of the first parallel connection terminal may be configured to be connected to the first electrode of the second battery block. The first member of the second parallel connection terminal may be configured to be connected to the second electrode of the first battery block. The second member of the second parallel connection terminal may be configured to be connected to the second electrode of the second battery block.

When the first member of the first parallel connection terminal is connected to the second member of the first parallel connection terminal, the first electrode of the first battery block can be connected to the first electrode of the second battery block. When the first member of the first parallel connection terminal is disconnected from the second member of the first parallel connection terminal, the first electrode of the first battery block can be electrically disconnected from the first electrode of the second battery block. When the first member of the second parallel connection terminal is connected to the second member of the second parallel connection terminal, the second electrode of the first battery block can be connected to the second electrode of the second battery block. When the first member of the second parallel connection terminal is disconnected from the second member of the second parallel connection terminal, the second electrode of the first battery block can be electrically disconnected from the second electrode of the second battery block.

The parallel connection terminal may be configured to connect the first battery block to the second battery block in parallel while the battery pack is charged.

By charging the battery pack while the first battery block is connected to the second battery block in parallel, the output voltage of the charger can be lowered compared to the case where the battery pack is charged in a state the first battery block is connected to the second battery block in series. Consequently, it is possible to simplify an insulation structure of the charger and reduce the size of the battery charger.

The battery pack may further include a communication terminal and a single controller. The single controller may be configured to collect a first battery information and a second battery information. The single controller may be configured to transmit the first battery information and the second battery information via the communication terminal. The first battery information is information about the first battery block, the second battery information is information about the second battery block.

By collecting and transmitting the first battery information and the second battery information using the single controller, it is possible to reduce the number of the controller and the physical size of the battery pack.

Each of the first battery block and the second battery block may include a positive electrode. The battery pack may include a first positive electrode line, a second positive electrode line, and a switcher. The first positive electrode line is connected between the positive electrode of the first battery block and the first output terminal, and the second positive electrode line is connected between the positive electrode of the second battery block and the second output terminal. The switcher is provided on each of the first positive electrode line and the second positive electrode line. The switcher is configured to set the first positive electrode line and the second positive electrode line to a semiconducting state in response to the state where nothing is connected to the terminal portion. The semiconducting state is an intermediate state between an interrupted state and a conducting state, and in the semiconducting state, less electric current is allowed to flow than electric current allowed to flow in the conducting state. In the interrupted state, electric current is interrupted between the positive electrode of the first battery block and the first output terminal, and electric current is interrupted between the positive electrode of the second battery block and the second output terminal. In the conducting state, electric current is allowed to flow between the positive electrode of the first battery block and the first output terminal, and electric current is allowed to flow between the positive electrode of the second battery block and the second output terminal.

Since the battery pack includes the switcher, the positive electrode line is in the semiconducting state during the storage of the battery pack. This reduces an excessive electric current flowing from a battery block having a higher voltage to a battery block having a lower voltage even when a voltage difference between the battery blocks is relatively large; and thus, reduces a failure in the battery pack.

In addition, the battery pack may further include a first battery circuit and a second battery circuit. The first battery circuit is connected to the first battery block. The first battery circuit may include the first output terminal and a photocoupler. The second battery circuit is connected to the second battery block. The second battery circuit may include the second output terminal, the communication terminal, and the single controller. The first battery information may be transmitted to the single controller via the photocoupler.

By transmitting the first battery information to the single controller via the photocoupler, the first battery block and the single controller can be insulated. Thus, it is possible for the single controller to inhibit from being affected by potential of the first battery block.

Also, the battery pack may further include a first detection circuit and a second detection circuit. The first detection circuit may be provided in the first battery circuit and configured to detect the first battery information. The second detection circuit may be provided in the second battery circuit and configured to detect the second battery information. The first detection circuit may be configured to output the first battery information to the single controller via the photocoupler.

By the first battery circuit outputting the first battery information to the single controller via the photocoupler, the first battery block and the single controller can be insulated.

Another one aspect of the present disclosure is to provide a battery system including a first electric working machine, a second electric working machine, and a battery pack. The first electric working machine is adapted to a first machine voltage. The second electric working machine is adapted to a second machine voltage higher than the first machine voltage. The battery pack includes a first battery block, a second battery block, and a terminal portion. The first battery block is configured to output a first voltage. The second battery block is configured to output a second voltage. The terminal portion is configured to be interchangeably connected to the first electric working machine or the second electric working machine. The terminal portion includes a parallel connection terminal, a first output terminal, and a second output terminal. The parallel connection terminal is configured to connect the first battery block to the second battery block in parallel, and electrically disconnect the first battery block from the second battery block. The first output terminal is connected to the first battery block. The second output terminal is connected to the second battery block. The first electric working machine includes a first connection terminal configured to be connected to the first output terminal and/or the second output terminal. The second electric working machine includes a second connection terminal configured to be connected to both the first output terminal and the second output terminal. The first output terminal connected to the second connection terminal is electrically disconnected from the second output terminal connected to the second connection terminal. The parallel connection terminal is configured to connect the first battery block to the second battery block in parallel in response to a state where the first electric working machine is connected to the terminal portion, or a state where nothing is connected to the terminal portion. The parallel connection terminal is configured to electrically disconnect the first battery block from the second battery block in response to a state where the second electric working machine is connected to the terminal portion. The terminal portion is configured to output a parallel voltage of the first battery block and the second battery block connected in parallel in response to the state where the first electric working machine is connected to the terminal portion. The terminal portion is configured to output the first voltage of the first battery block and the second voltage of the second battery block individually in response to the state where the second electric working machine is connected to the terminal portion.

The battery system according to another one aspect of the present disclosure, the same effects as the battery pack described above can be achieved.

The second electric working machine may include an adder circuit configured to add the first voltage of the first battery block and the second voltage of the second battery block input via the second connection terminal.

With the adder circuit, the second electric working machine can use the sum voltage higher than the first voltage and the second voltage by adding the individually input first voltage of the first battery block and the second voltage of the second battery block.

The second electric working machine may include an adapter portion and a main body. The adapter portion may include the second connection terminal and an adapter side terminal. The main body may include a body side terminal. The body side terminal may be configured to be connected to the adapter side terminal.

Even when the main body of the second electric working machine is adapted to the relatively high voltage and is not adapted to the battery pack, the battery pack can be connected to the second electric working machine by connecting the adapter portion to the main body.

The adapter portion may include an adder circuit configured to add both the first voltage of the first battery block and the second voltage of second battery block input via the second connection terminal.

By the adapter portion including the adder circuit, the second electric working machine can use the sum voltage higher than the first voltage and the second voltage even if the main body do not have a function to add the individually input first voltage and the second voltage.

The first output terminal and the second output terminal may be arranged in a line. The second connection terminal may be formed into a plate shape. The second connection terminal may include a first conduction area and a second conduction area, and an insulation area. The first conduction area may be configured to physically come in contact with the first output terminal. The second conduction area may be configured to physically come in contact with the second output terminal. The insulation area may be arranged between the first conduction area and the second conduction area.

By arranging the insulation area between the first conduction area and the second conduction area of the second connection terminal, it is possible to electrically disconnect the first output terminal connected to the second connection terminal from the second output terminal connected to the second connection terminal.

DETAILED DESCRIPTION OF EXEMPLARY EMBODIMENTS

Hereinafter, some embodiments of the present disclosure will be described with reference to the accompanying drawings.

First Embodiment

A battery system of the present embodiment includes a battery pack 10, a first electric working machine 70, and a second electric working machine 80, and a charger 90.

<1-1. Configuration of Battery Pack>

Figure 1:
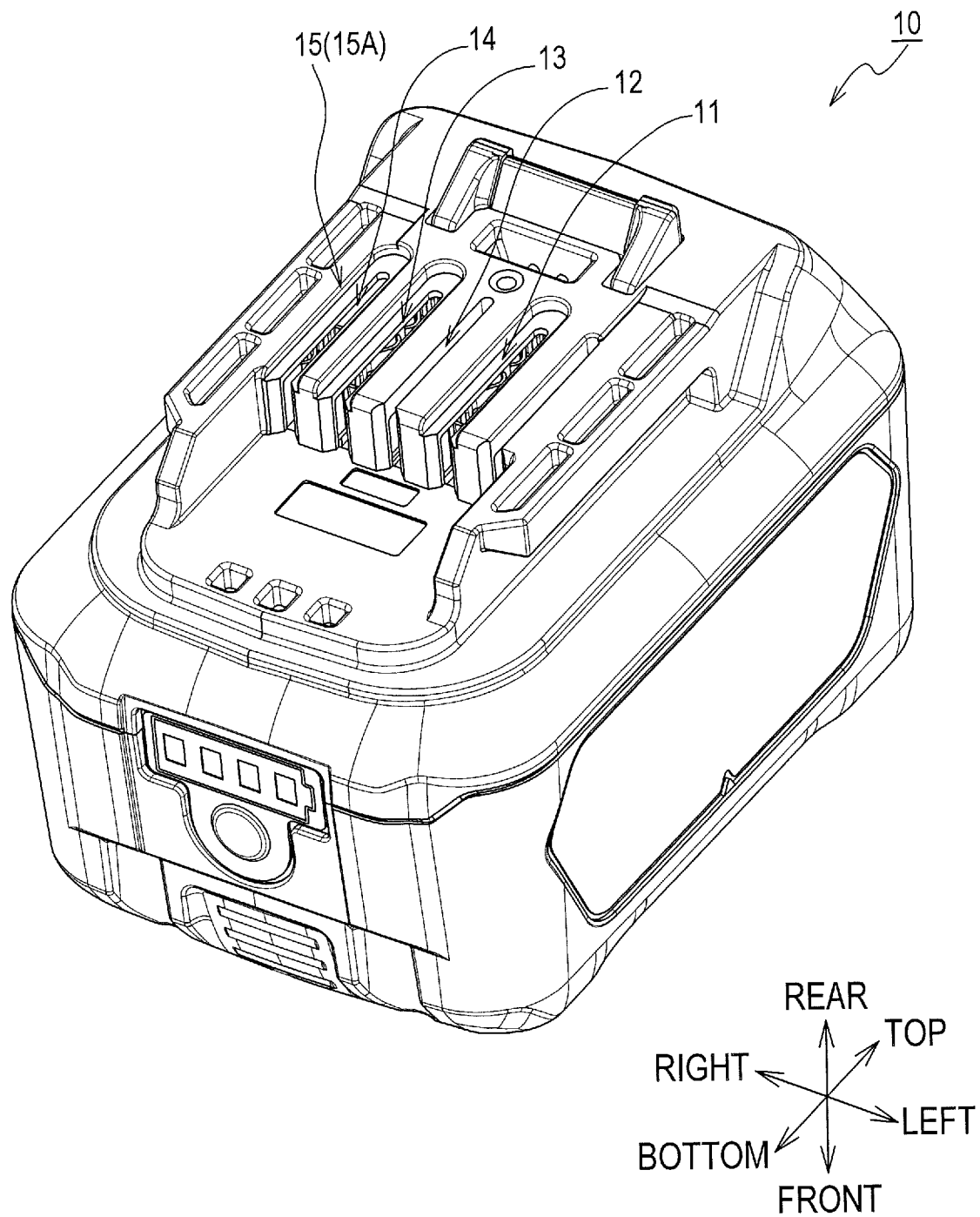
FIG. 1 is a view showing an external appearance of a battery pack in a first embodiment.

First, a description will be given of a configuration of the battery pack 10 with reference to FIGS. 1 to 3. The battery pack 10 has a terminal portion 15 on the rear surface of a resin case thereof. The battery pack 10 further includes, inside the case, two battery blocks 21, 22, a first battery circuit 210 connected to the battery block 21 and a second battery circuit 220 connected to the battery block 22.

The battery blocks 21, 22 are battery blocks of the same rated voltage, and each battery block includes battery cells connected in series. The battery blocks 21, 22 are, for example, lithium ion rechargeable batteries, and the rated voltage is, for example, 18V.

Figure 2:
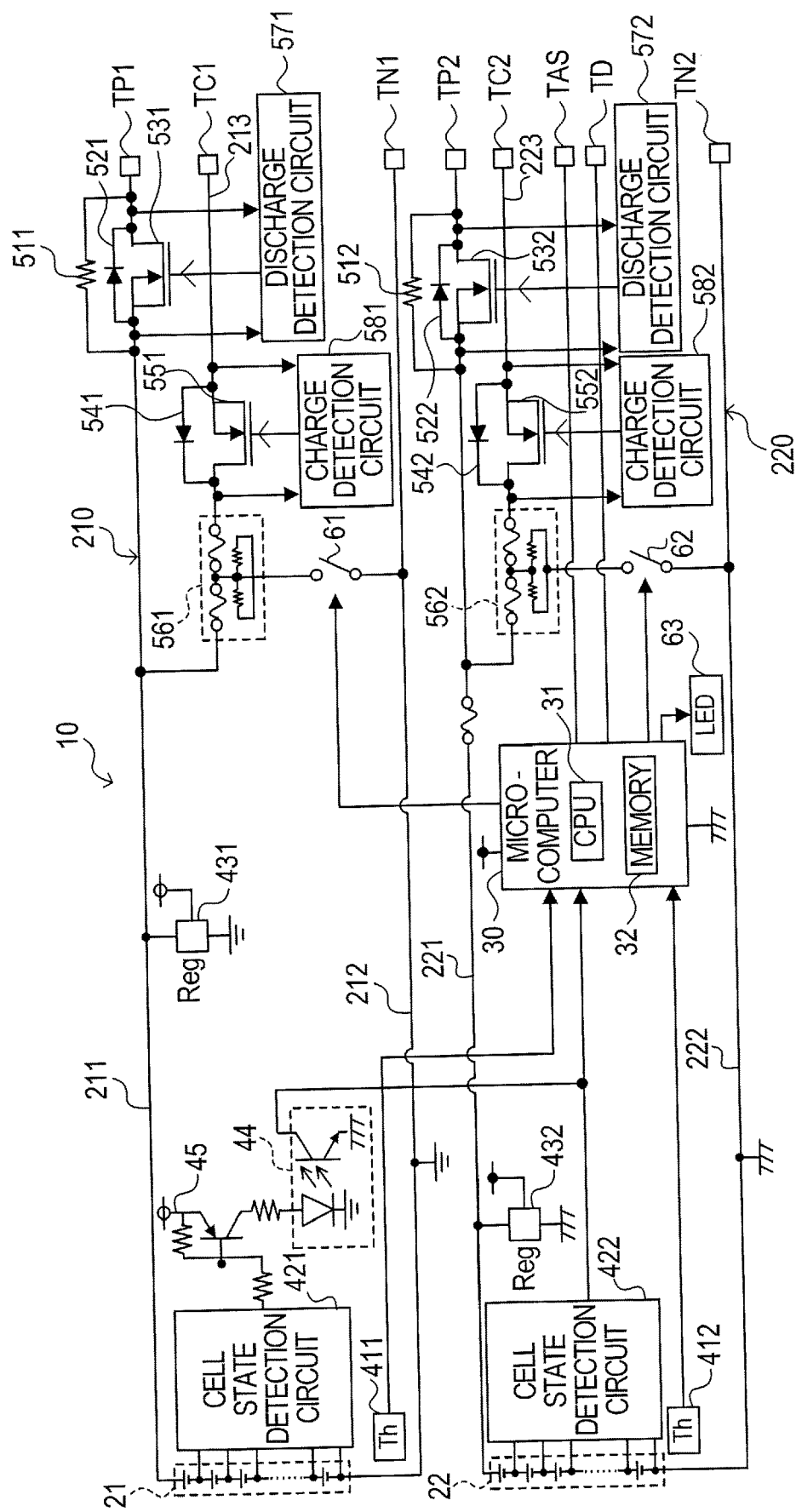
FIG. 2 is a block diagram showing a configuration of the battery pack in the first embodiment.

As shown in FIG. 2, a first positive electrode line 211 is connected to a positive electrode of the battery block 21, and a first negative electrode line 212 connected to a ground is connected to a negative electrode of the battery block 21. A potential of the first negative electrode line 212 becomes a ground level of the first battery circuit 210. A first positive electrode terminal TP1 is connected to the first positive electrode line 211, and a first negative electrode terminal TN1 is connected to the first negative electrode line 212. Also, a first charging terminal TC1 is connected to a first charging line 213 connected to the first positive electrode line 211.

Also, a second positive electrode line 221 is connected to a positive electrode of the battery block 22, and a second negative electrode line 222 connected to the ground is connected to a negative electrode of the battery block 22. A potential of the second negative electrode line 222 becomes a ground level of the second battery circuit 220. A second positive electrode terminal TP2 is connected to the second positive electrode line 221, and a second negative electrode terminal TN2 is connected to the second negative electrode line 222. When the first negative electrode terminal TN1 and the second negative electrode terminal TN2 are electrically connected, the ground level of the first battery circuit 210 and a ground level of the second battery circuit 220 become the same potential. Also, a second charging terminal TC2 is connected to a second charging line 223 connected to the second positive electrode line 221.

The first battery circuit 210 and the second battery circuit 220 have the same basic configuration. First, a description will be given of a common configuration of the first battery circuit 210 and the second battery circuit 220. The first battery circuit 210 includes a cell state detection circuit 421, a temperature detection circuit 411, a regulator 431, a Self Control Protector (SCP) circuit 561, a discharge reverse flow prevention Field Effect transistor (FET) 531, a semiconducting resistor 511, a charge reverse flow prevention FET 551, a discharge detection circuit 571, a charge detection circuit 581 and a switch 61. The second battery circuit 220 includes a cell state detection circuit 422, a temperature detection circuit 412, a regulator 432, a Self Control Protector (SCP) circuit 562, a discharge reverse flow prevention Field Effect transistor (FET) 532, a semiconducting resistor 512, a charge reverse flow prevention FET 552, a discharge detection circuit 572, a charge detection circuit 582 and a switch 62.

The regulators 431 and 432 are respectively connected to the first positive electrode line 211 and the second positive electrode line 221. The regulator 431 receives power supply from the battery block 21 and generates a power supply voltage to be used in the first battery circuit 210. The regulator 432 receives power supply from the battery blocks 22 and generates a power supply voltage to be used in the second battery circuit 220. The power supply voltage generated by the regulator 431 is a voltage based on the ground level of the first battery circuit 210. The power supply voltage generated by the regulator 432 is a voltage based on the ground level of the second battery circuit 220.

The cell state detection circuits 421, 422 are respectively connected to the battery blocks 21, 22. The cell state detection circuit 421 detects a cell voltage of each of the battery cells included in the battery block 21, and the cell state detection circuit 422 detects a cell voltage of each of the battery cells included in the battery block 22. In addition, the cell state detection circuit 421 detects a charging current flowing into the battery block 21 and detects a discharge current flowing out from the battery block 21. The cell state detection circuit 422 detects the charging current flowing into the battery block 22 and detects a discharge current flowing out from the battery block 22. The cell state detection circuits 421, 422 convert a detected value to a digital signal, and output the digital signal to a below-described microcomputer 30.

Each of the temperature detection circuits 411, 412 includes a thermistor and detects a cell temperature of at least one battery cell included in the battery blocks 21, 22. The temperature detection circuits 411, 412 output the detected cell temperature as an analog signal to the below-described microcomputer 30.

The SCP circuits 561 and 562 are respectively arranged on the first charging line 213 and the second charging line 223. The SCP circuits 561, 562 serve to avoid an overcharged state of the battery blocks 21, 22. The switch 61 is connected between the SCP circuit 561 and the first negative electrode line 212, and the switch 62 is connected between the SCP circuit 562 and the second negative electrode line 222.

Each of the SCP circuits 561, 562 includes a self-melting fuse and a heat generation resistive element. The microcomputer 30 commands the switches 61, 62 to switch to ON when the battery blocks 21, 22 cannot be continuously used. In response to the switches 61, 62 turned ON from OFF by the command from the microcomputer 30, a heat generation resistive element in the SCP circuits 561, 562 generates heat by electric current, and the self-melting fuse is melted. This blocks the first charging line 213 and the second charging line 223; thus, it becomes impossible to charge the battery blocks 21, 22.

The discharge reverse flow prevention FETs 531 and 532 are respectively arranged on the first positive electrode line 211 and the second positive electrode line 221. The discharge reverse flow prevention FET 531 includes a parasitic diodes 521 and the discharge reverse flow prevention FET 532 includes a parasitic diode 522. The anode terminal of the parasitic diode 521 is connected to the positive electrode of the battery block 21, and the cathode terminal of the parasitic diode 521 is connected to the first positive electrode terminal TP1. The anode terminal of the parasitic diode 522 is connected to the positive electrode of the battery block 22, and the cathode terminal of the parasitic diode 522 is connected to the second positive electrode terminal TP2. The discharge detection circuit 571 inhibits electric current from flowing from the first positive electrode terminal TP1 to the positive electrode of the battery block 21 by use of the parasitic diode 521. The discharge detection circuit 572 inhibits electric current from flowing from the second positive electrode terminal TP2 to the positive electrode of the battery block 22 by use of the parasitic diode 522.

The discharge detection circuit 571 is connected to a drain terminal and a source terminal of the discharge reverse flow prevention FET 531, and the discharge detection circuit 572 is connected to a drain terminal and a source terminal of the discharge reverse flow prevention FET 532. The discharge detection circuit 571 measures a potential difference between the drain terminal and the source terminal of the discharge reverse flow prevention FET 531, and the discharge detection circuit 572 measures a potential difference between the drain terminal and the-source terminal of the discharge reverse flow prevention FET 532. Until the discharge detection circuits 571, 572 detect a discharge current flowing in a forward direction of the parasitic diodes 521, 522 by use of the potential difference, the discharge detection circuits 571, 572 set the discharge reverse flow prevention FETs 531, 532 in an OFF state. In response to the detection of the discharge current flowing in the forward direction of the parasitic diodes 521, 522, the discharge detection circuits 571, 572 turn ON the discharge reverse flow prevention FETs 531, 532 from OFF.

The semiconducting resistor 511 is connected in parallel with the parasitic diode 521 between the drain terminal and the source terminal of the discharge reverse flow prevention FET 531. The semiconducting resistor 512 is connected in parallel with the parasitic diode 522 between the drain terminal and the source terminal of the discharge reverse flow prevention FET 532. The semiconducting resistor 511 serves to bring a semiconducting state between the positive electrode of the battery block 21 and the first positive electrode terminal TP1. The semiconducting resistors 512 serves to bring the semiconducting state between the positive electrode of the battery block 22 and the second positive electrode terminal TP2. The semiconducting state is an intermediate state between an interrupted state and a conducting state. In the interrupted state, electric current is interrupted between the positive electrode of the battery block 21 and the first positive electrode terminal TP1, and between the positive electrode of the battery block 22 and the second positive electrode terminal TP2. In the conducting state, electric current flows between the positive electrode of the battery block 21 and the first positive electrode terminal TP1, and between the positive electrode of the battery block 22 and the second positive electrode terminal TP2. In the semiconducting state, less electric current flows between the positive electrode of the battery block 21 and the first positive electrode terminal TP, and between the positive electrode of the battery block 22 and the second positive electrode terminal TP2 than the conducting state. That is, a resistance value of the semiconducting resistors 511, 512 is adjusted so as to flow less electric current than the amount of electric current when the discharge reverse flow prevention FETs 531, 532 are in an ON state.

Due to use of the battery block 21 and the battery block 22, a voltage difference between the battery block 21 and the battery block 22 may occur. Especially, as described below, when the battery block 21 and the battery block 22 are used independently for a long time, the voltage difference may increase. To equalize the voltage, as described below, the battery block 21 and the battery block 22 are connected in parallel when the battery pack 10 is stored.

If the battery blocks 21, 22 having a large voltage difference are connected in parallel while the discharge reverse flow prevention FETs 531, 532 are in the ON state, excessive electric current flows from a higher voltage side to a lower voltage side, which may cause failure. Thus, at the time of storage of the battery pack 10, the discharge reverse flow prevention FETs 531, 532 are turned OFF, and then the battery blocks 21, 22 are connected in parallel. This enables relatively small electric current to flow from the higher voltage side to the lower voltage side through the semiconducting resistors 511, 512, even if the voltage difference of the battery blocks 21, 22 is large. As a result, a voltage of the battery block 21 and a voltage of the battery block 22 are equalized while inhibiting the excessive electric current. The resistance value of the semiconducting resistors 511, 512 is set to a degree that the voltage of the battery block 21 and the voltage of the battery block 22 can be equalized in several hours while inhibiting the excessive electric current.

The charge reverse flow prevention FET 551 is arranged on the first charging line 213, and the charge reverse flow prevention FET 552 is arranged on the second charging line 223. The charge reverse flow prevention FET 551 includes a parasitic diode 541 and the charge reverse flow prevention FET 552 includes a parasitic diode 542. The parasitic diode 541 is connected to the first charging terminal TC1 on the anode terminal, and the parasitic diode 542 is connected to the second charging terminal TC2 on the anode terminal. The parasitic diode 541 is connected to the SCP circuit 561 on the cathode terminal, and the parasitic diode 542 is connected to the SCP circuit 562 on the cathode terminal. The charge detection circuit 581 inhibits the electric current from flowing from the positive electrode of the battery block 21 to the first charging terminal TC1 using the parasitic diode 541. The charge detection circuit 582 inhibits the electric current from flowing from the positive electrode of the battery block 22 to the second charging terminal TC2 using the parasitic diode 542.

The charge detection circuit 581 is connected to the drain terminal and the source terminal of the charge reverse flow prevention FET 551, and the charge detection circuit 582 is connected to the drain terminal and the source terminal of the charge reverse flow prevention FET 552. The charge detection circuit 581 measures a potential difference between the drain terminal and the source terminal of the charge reverse flow prevention FET 551, and the charge detection circuit 582 measures a potential difference between the drain terminal and the source terminal of the charge reverse flow prevention FET 552. Until the charge detection circuits 581, 582 detect the charging current flowing in a forward direction of the parasitic diodes 541, 542 by use of the potential difference, the charge detection circuits 581, 582 set the charge reverse flow prevention FETs 551, 552 in the OFF state Also, the charge detection circuits 581, 582 turn ON the charge reverse flow prevention FETs 551, 552 from OFF when the charge detection circuits 581, 582 detect the charging current flowing in the forward direction of the parasitic diodes 541, 542.

Next, a description will be given of a different configuration of the first battery circuit 210 and the second battery circuit 220. The first battery circuit 210 includes a photocoupler 44 and a power source 45. On the other hand, the second battery circuit 220 includes the microcomputer 30 and a Light Emitting Diode (LED) 63.

The battery pack 10 is connected to a target device so that potential of the second negative electrode line 222 of the second battery circuit 220 is a reference potential (that is, a reference ground level). Thus, the microcomputer 30 is provided in the second battery circuit 220 whose potential is the reference potential, and the microcomputer 30 is not provided in the first battery circuit 210.

The microcomputer 30 includes a CPU 31 and a memory 32, such as a ROM and a RAM. The microcomputer 30 executes various processes by the CPU 31 executing a program stored in the memory 32.

The microcomputer 30 is connected to a first communication terminal TAS and a second communication terminal TD via signal lines. The first communication terminal TAS is connected to the first electric working machine 70 or the second electric working machine 80. The second communication terminal TD is connected to the charger 90.

The microcomputer 30 is connected to the temperature detection circuits 411, 412 and the cell state detection circuit 422 via signal lines. In addition, the microcomputer 30 is connected to the photocoupler 44 via a signal line. An input side of the photocoupler 44 is connected to the cell state detection circuit 421, and an output side of the photocoupler 44 is connected to the microcomputer 30. The input side of the photocoupler 44 is operated by a power supply from the power source 45, and the output side of the photocoupler 44 is operated by a power supply from the second battery circuit 220. Thus, the battery block 21 and the microcomputer 30 are insulated. Thus, the microcomputer 30 is not influenced by a potential of the battery block 21.

The microcomputer 30 determines whether the battery blocks 21, 22 are in a dischargeable state or not based on a battery information of the battery blocks 21, 22 obtained from the temperature detection circuits 411, 412 and the cell state detection circuits 421, 422. When both of the battery blocks 21, 22 is in the dischargeable state, the microcomputer 30 transmits a discharge permission signal, via the first communication terminal TAS, to the first electric working machine 70 or the second electric working machine 80. When at least one of the battery blocks 21, 22 is in a non-dischargeable state (for example, the over discharge state), the microcomputer 30 transmits a discharge stop signal, via the first communication terminal TAS, to the first electric working machine 70 or the second electric working machine 80. Also, the microcomputer 30 may receive a working machine information about the working machines, via the first communication terminal TAS, from the first electric working machine 70 or the second electric working machine 80.

Also, the microcomputer 30 collects a first battery information on the battery block 21 and a second battery information on the battery block 22, and transmits the collected battery information, via the second communication terminal TD, to the charger 90. Furthermore, the microcomputer 30 receives charging information, via the second communication terminal TD, from the charger 90.

Also, the microcomputer 30 is connected to an LED 63, and turns on, blinks, and turns off the LED 63 in accordance with the state of the battery pack 10. The LED 63 is arranged in the battery pack 10 at a position easily viewed by a user. The microcomputer 30 makes the LED 63 display, for example, a remaining energy amount of the battery pack 10.

Here, the configuration of the first battery circuit 210 and the configuration of the second battery circuit 220 are different, which causes a difference in power consumption. Since the second battery circuit 220 is mounted with the microcomputer 30, the second battery circuit 220 consumes more electric power than the first battery circuit 210. As a result, the battery block 22 decreases the remaining energy amount faster than the battery block 21. Thus, in the battery pack 10, the battery blocks 21, 22 are regularly equalized.

Specifically, the difference in power consumption between the first battery circuit 210 and the second battery circuit 220 can be calculated in advance. Thus, at every specified period, in which an accumulation of the difference in power consumption reaches a specified amount, a capacitor is connected to the battery block 21 to transfer a part of the remaining energy of the battery block 21 to the capacitor. Then, the capacitor is disconnected from the battery block 21, and the capacitor is connected to the battery block 22 to transfer the energy accumulated in the capacitor to the battery block 22. A capacitance of the capacitor is set to a value that can equalize the difference in power consumption at every specified period.

Next, a description will be given of a detailed configuration of the terminal portion 15 of the battery pack 10. As shown in FIG. 1, the terminal portion 15 of the battery pack 10 includes a first insertion slot 11, a second insertion slot 12, a third insertion slot 13, and a fourth insertion slot 14. Each of the first insertion slot 11, the second insertion slot 12, third insertion slot 13 and the fourth insertion slot 14 is an insertion slot extending in a top-bottom direction with the bottom opened. A plate-shaped terminal of the target device is inserted into each of the first insertion slot 11, the second insertion slot 12, third insertion slot 13 and the fourth insertion slot 14 from the bottom toward the top. Also, the first insertion slot 11, the second insertion slot 12, the third insertion slot 13, and the fourth insertion slot 14 are arranged in this order, from left to right.

Figure 3:
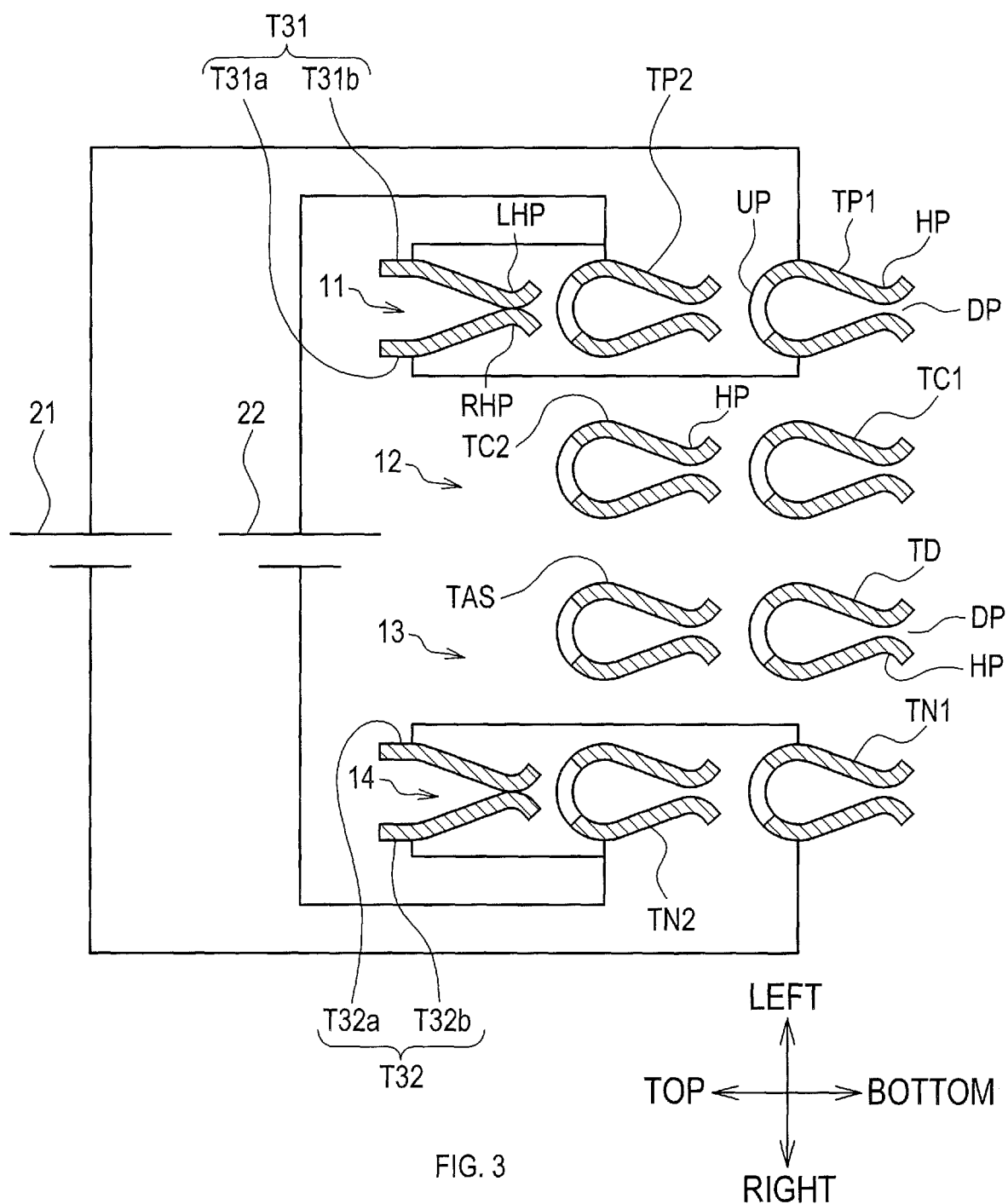
FIG. 3 is a schematic view showing a shape of each terminal in a terminal portion of the battery pack and a connecting state between a battery block and each terminal in the first embodiment.

As shown in FIG. 3, the first insertion slot 11 is provided with the first positive electrode terminal TP1, the second positive electrode terminal TP2, and a first parallel connection terminal T31 in this order from the bottom toward the top. The second insertion slot 12 is provided with the first charging terminal TC1 and the second charging terminal TC2 in this order from the bottom toward the top. The third insertion slot 13 is provided with the second communication terminal TD and the first communication terminal TAS in this order from the bottom toward the top. The fourth insertion slot 14 is provided with the first negative electrode terminal TN1, the second negative electrode terminal TN2, a second parallel connection terminal T32 in this order from the bottom toward the top.

FIG. 3 is a plane surface of the terminal portion 15 seen from a rear side. The first positive electrode terminal TP1 is formed by a metal plate bent into a U-shape, and has recessed portions HP formed by pressing both side surfaces in the vicinity of an opening end portion DP of the U-shaped metal plate inward. The first positive electrode terminal TP1 is arranged so that the opening end portion DP is on the bottom side, and the first positive electrode terminal TP1 is configured so that the recessed portions HP come in contact with both surfaces of the plate-shaped terminal. To hold the plate-shaped terminal in contact with the recessed portions HP in a state where the plate-shaped terminal penetrates from the bottom toward the top, a slot UP is formed on an upper side of the first positive electrode terminal TP1, opposite to the opening end portion DP.

The second positive electrode terminal TP2, the first charging terminal TC1, the second charging terminal TC2, the first communication terminal TAS, the second communication terminal TD, the first negative electrode terminal TN1 and the second negative electrode terminal TN2 are configured to have a similar shape of the first positive electrode terminal TP1.

The first parallel connection terminal T31 includes a first member T31a and a second member T31b. The first member T31a and the second member T31b are plate-shaped metal members, and arranged so as to extend in the top-bottom direction. The first member T31a and the second member T31b are arranged on left and right. The first member T31a has a recessed portion LHP having a shape recessed toward the second member T31b in the vicinity of the bottom of the first member T31a. The second member T31b has a recessed portion RHP having a shape recessed toward the first member T31a in the vicinity of the bottom of the second member T31b.

The first member T31a and the second member T31b are connected by bringing the recessed portion LHP of the first member T31a and the recessed portion RHP of the second member T31b into physically contact with each other, and are physically disconnected by keeping away the recessed portion LHP of the first member T31a and the recessed portion RHP of the second member T31b from each other. That is, the first member T31a and the second member T32b are configured so as to be connected and disconnected. The first member T31a and the second member T31b are physically connected when nothing is inserted into the first parallel connection terminal T31. The first member T31a and the second member T31b are physically disconnected when the plate-shaped terminal is inserted into the first parallel connection terminal T31.

Similarly, the second parallel connection terminal T32 includes a first member T32a and a second member T32b.

The first member T32a and the second member T32b are configured to be similar to the first member T31a and the second member T31b.

The first member T31a of the first parallel connection terminal T31 is connected to the first positive electrode terminal TP1. The first positive electrode terminal TP1 is connected to the positive electrode of the battery block 21. The second member T31b of the first parallel connection terminal T31 is connected to the second positive electrode terminal TP2. The second positive electrode terminal TP2 is connected to the positive electrode of the battery block 22. Accordingly, by connecting the first member T31a and the second member T31b, the positive electrode of the battery block 21 and the positive electrode of the battery block 22 are connected. Also, by disconnecting the first member T31a and the second member T31b, the positive electrode of the battery block 21 and the positive electrode of the battery block 22 are disconnected.

In addition, the first member T32a of the second parallel connection terminal T32 is connected to the first negative electrode terminal TN1. The first negative electrode terminal TN1 is connected to the negative electrode of the battery block 21. The second member T32b of the second parallel connection terminal T32 is connected to the second negative electrode terminal TN2, The second negative electrode terminal TN2 is connected to the negative electrode of the battery block 22. Accordingly, by connecting the first member T32a and the second member T32b, the negative electrode of the battery block 21 and the negative electrode of the battery block 22 are connected. Also, by disconnecting the first member T32a and the second member T32b, the negative electrode of the battery block 21 and the negative electrode of the battery block 22 are disconnected. Thus, when a target device is not connected to the terminal portion 15, the battery block 21 and the battery block 22 are connected in parallel.

In the present embodiment, the first positive electrode terminal TP1 and the first negative electrode terminal TN1 correspond to one example of a first output terminal of the present disclosure, and the second positive electrode terminal TP2 and the second negative electrode terminal TN2 correspond to one example of a second output terminal of the present disclosure. The first parallel connection terminal T31 and the second parallel connection terminal T32 correspond to one example of a parallel connection terminal of the present disclosure. Also in the present embodiment, the discharge reverse flow prevention FET 531 and the semiconducting resistor 511, and the discharge reverse flow prevention FET 532 and the semiconducting resistor 512 correspond to one example of a switcher of the present disclosure.

<1-2. Configuration of First Electric Working Machine>

Figure 4:
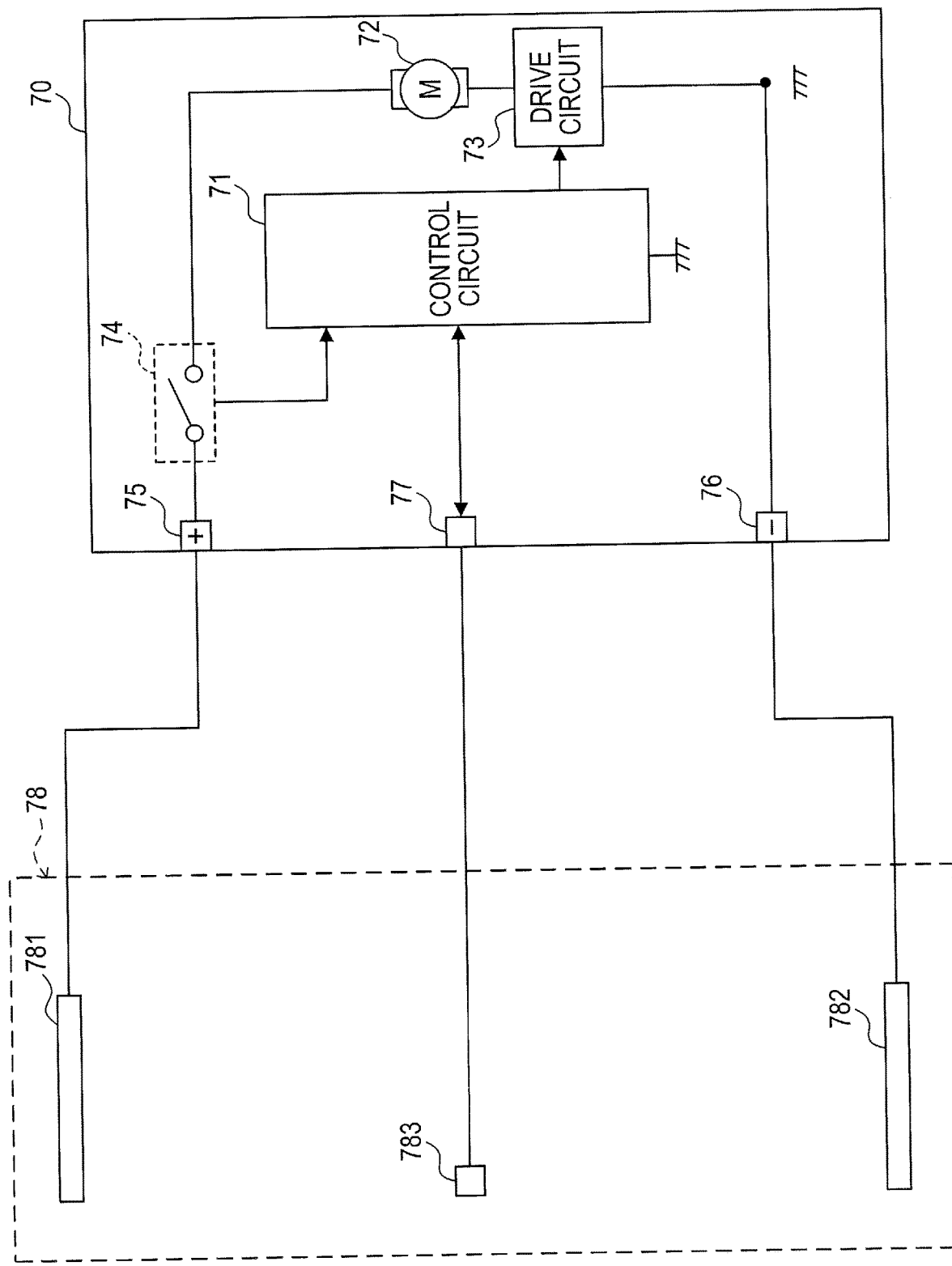
FIG. 4 is a block diagram showing a configuration of a first electric working machine in the first embodiment.

Next, a description will be given of a schematic configuration of the first electric working machine 70 with reference to FIG. 4 and FIG. 5.

The first electric working machine 70 is a working machine adapted to a relatively low voltage (for example, 18V). The first electric working machine 70 is an electric power tool, such as a grass cutter, an impact driver, a chainsaw, a hedge trimmer, and a blower.

The first electric working machine 70 includes a motor 72, a drive circuit 73, a control circuit 71, a trigger switch 74, a tool positive electrode input terminal 75, a tool negative electrode input terminal 76, a tool signal input terminal 77, and an attachment portion 78. The motor 72 is a three-phase brushed direct-current motor. The drive circuit 73 is a circuit configured to flow electric current to the motor 72. The trigger switch 74 is switched to ON when a user pulls a trigger (not shown), and transmits a trigger ON-signal to the control circuit 71. When receiving the trigger ON-signal, the control circuit 71 controls the drive circuit 73 to rotate the motor 72. In addition, when receiving a discharge stop signal from the tool signal input terminal 77, the control circuit 71 controls the drive circuit 73 to stop the rotation of the motor 72. The motor 72 may be a three-phase brushless motor.

The attachment portion 78 is attached to the terminal portion 15 of the battery pack 10. The attachment portion 78 includes a first tool positive electrode terminal 781 that is a terminal on a positive electrode side, a first tool negative electrode terminal 782 that is a terminal on a negative electrode side, and a first tool communication terminal 783. The first tool positive electrode terminal 781, the first tool negative electrode terminal 782, and the first tool communication terminal 783 are respectively connected to the tool positive electrode input terminal 75, the tool negative electrode input terminal 76, and the tool signal input terminal 77.

Figure 5:
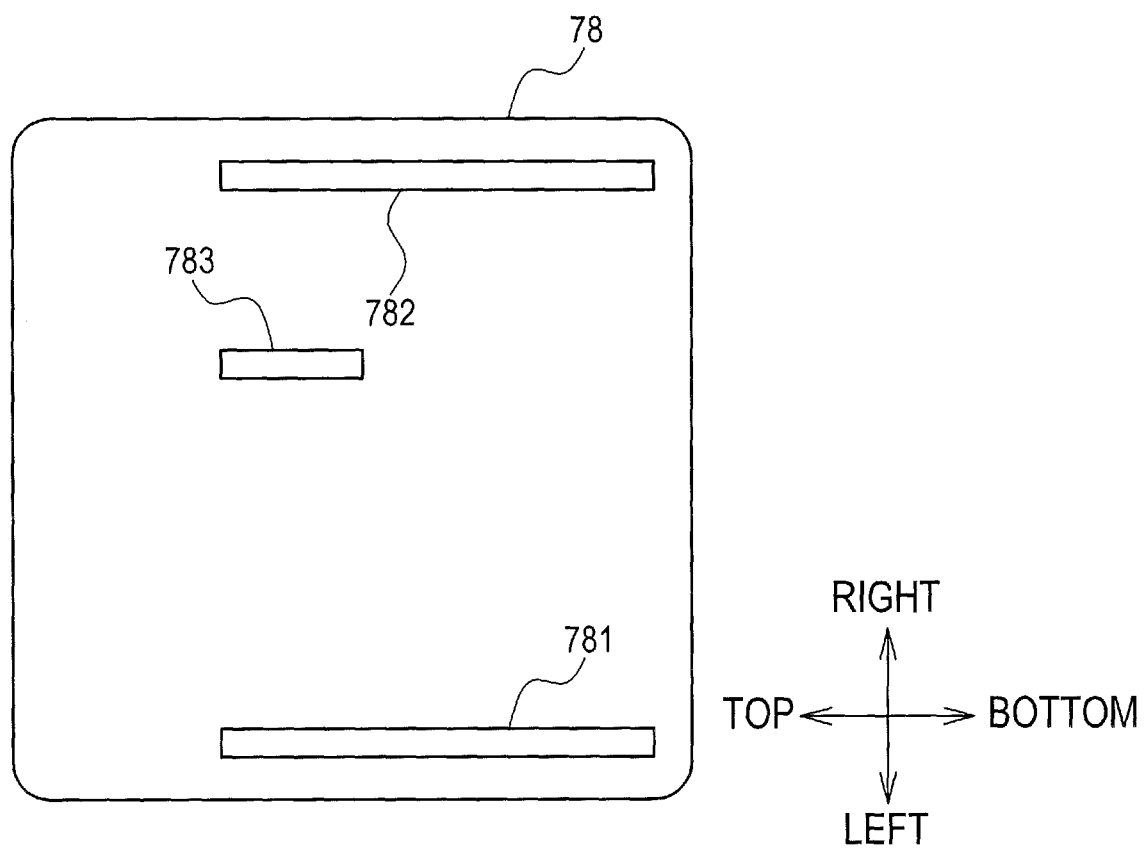
FIG. 5 is a schematic view showing a configuration of an attachment portion of the first electric working machine in the first embodiment.

FIG. 5 is a plan view of the attachment portion 78 seen from a front side, and shows a surface opposite to the terminal portion 15 of the battery pack 10. Each of the first tool positive electrode terminal 781, the first tool negative electrode terminal 782, and the first tool communication terminal 783 is a plate-shaped metal member.

Figure 6:
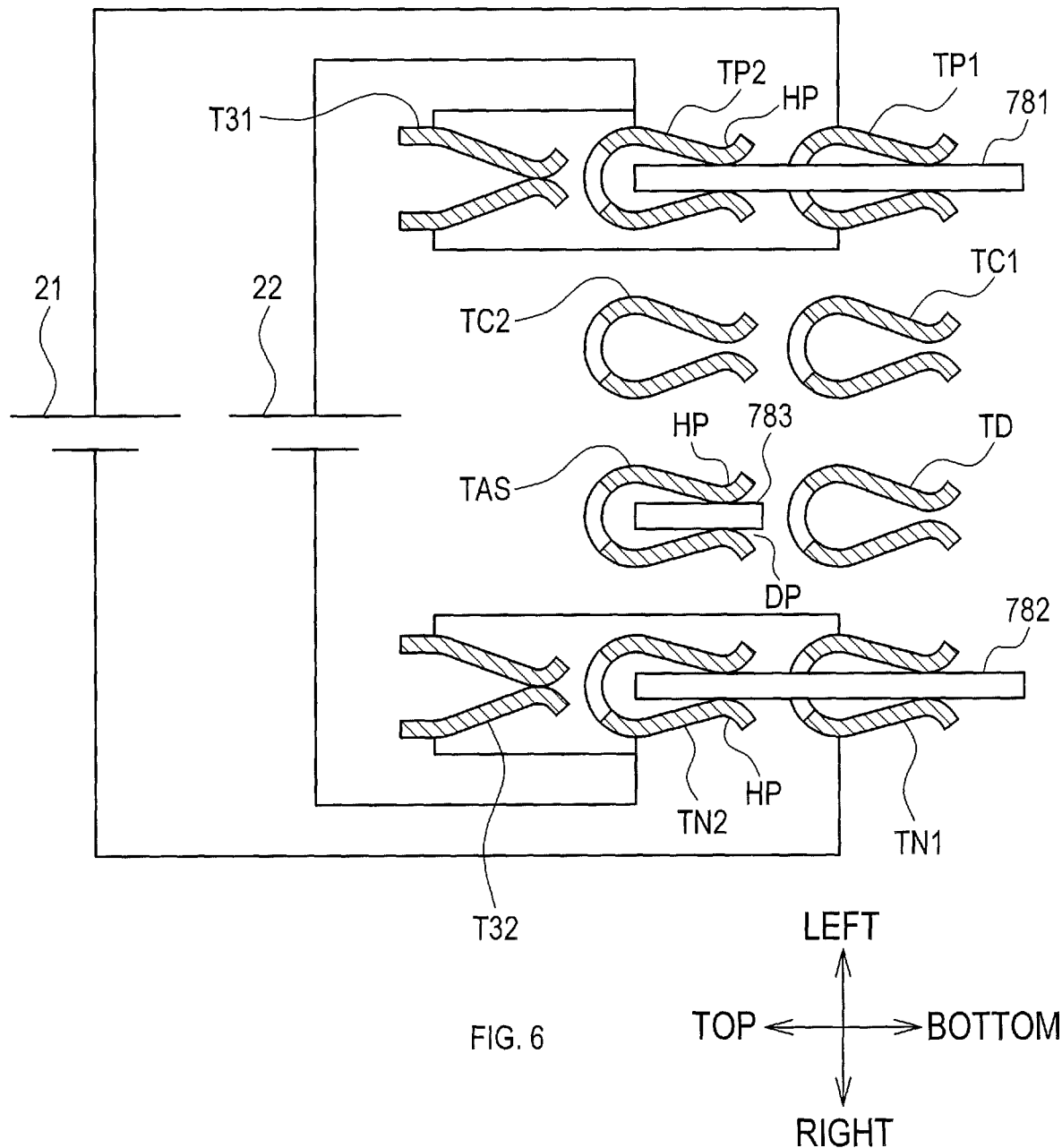
FIG. 6 is a schematic view showing a state where the attachment portion of the first electric working machine is attached to the terminal portion of the battery pack in the first embodiment.

As shown in FIG. 6, the first tool positive electrode terminal 781 is arranged at a position corresponding to the first insertion slot 11, and inserted into the first insertion slot 11. The first tool positive electrode terminal 781 is configured to have a length to penetrate the first positive electrode terminal TP1 and enter between the recessed portions HP of the second positive electrode terminal TP2 but not to penetrate the second positive electrode terminal TP2.

The first tool negative electrode terminal 782 is arranged at a position corresponding to the fourth insertion slot 14, and inserted into the fourth insertion slot 14. The first tool negative electrode terminal 782 is configured to have a length to penetrate the first negative electrode terminal TN1 and enter between the recessed portions HP of the second negative electrode terminal TN2, but not to penetrate the second negative electrode terminal TN2.

The first tool communication terminal 783 is arranged at a position corresponding to the first communication terminal TAS of the third insertion slot 13, and inserted into the third insertion slot 13. The first tool communication terminal 783 is configured to have a length longer than a distance from the opening end portion DP of the first communication terminal TAS to the recessed portion HP of the first communication terminal TAS.

As shown in FIG. 6, by inserting the attachment portion 78 from the bottom toward the top into the terminal portion 15 of the battery pack 10, the attachment portion 78 is attached to the terminal portion 15 of the battery pack 10. When the attachment portion 78 is attached to the terminal portion 15, the first tool positive electrode terminal 781 is electrically connected to the first positive electrode terminal TP1 and the second positive electrode terminal TP2. As a result, the tool positive electrode input terminal 75 is electrically connected to the positive electrodes of the battery blocks 21, 22. Also, the first tool negative electrode terminal 782 is electrically connected to the first negative electrode terminal TN1 and the second negative electrode terminal TN2. As a result, the tool negative electrode input terminal 76 is electrically connected to the negative electrodes of the battery blocks 21, 22.

Accordingly, when the attachment portion 78 is attached to the terminal portion 15, the battery block 21 and the battery block 22 are connected in parallel, and a first voltage and a second voltage of the battery blocks 21, 22, which are connected in parallel, is output from the terminal portion 15 of the battery pack 10 to the first electric working machine 70. The first voltage and the second voltage have approximately the same value. Then the first voltage and a second voltage of the battery blocks 21, 22, which are connected in parallel, is input between the tool positive electrode input terminal 75 and the tool negative electrode input terminal 76 of the first electric working machine 70.

When the attachment portion 78 is attached to the terminal portion 15, the first tool communication terminal 783 and the first communication terminal TAS are electrically connected.

In this case, the first member T31*a* and the second member T31*b* of the first parallel connection terminal T31 are connected, and the first member T32*a* and the second member T32*b* of the second parallel connection terminal T32 are connected. Accordingly, when the first tool positive electrode terminal 781 is connected to either one of the first positive electrode terminal TP1 and the second positive electrode terminal TP2, and the first tool negative electrode terminal 782 is connected to either one of the first negative electrode terminal TN1 and the second negative electrode terminal TN2, the first voltage and a second voltage of the battery blocks 21, 22, which are connected in parallel, is input between the tool positive electrode input terminal 75 and the tool negative electrode input terminal 76. Thus, the first tool positive electrode terminal 781 may be configured to be connected to only one of the first positive electrode terminal TP1 and the second positive electrode terminal TP2. Also, the first tool negative electrode terminal 782 may be configured to be connected to only one of the first negative electrode terminal TN1 and the second negative electrode terminal TN2.

In the present embodiment, the first tool positive electrode terminal 781 and the first tool negative electrode terminal 782 correspond to one example of a first connection terminal of the present disclosure.

<1-3. Configuration of Second Electric Working Machine>

Next, a description will be given of a schematic configuration of the second electric working machine 80 with reference to FIG. 7 and FIG. 8.

The second electric working machine 80 is a working machine adapted to a relatively high voltage (for example, 36V). The second electric working machine 80 is an electric power tool, such as a grass cutter, an impact driver, a chainsaw, a hedge trimmer, and a blower.

The second electric working machine 80 includes a main body 81, an adapter portion 82, and an attachment portion 84. The attachment portion 84 is arranged on the adapter portion 82, and attached to the terminal portion 15 of the battery pack 10. The main body 81 and the adapter portion 82 are separate devices, and the adapter portion 82 is electrically and mechanically connected to the main body 81.

The main body 81 includes a motor 812, a drive circuit 813, a regulator 814, a control circuit 811, a stop circuit 815, and a trigger switch 816. Also, the main body 81 includes a second tool positive electrode input terminal 817, a second tool negative electrode input terminal 818, and a second tool signal input terminal 819, which are terminals on a main body side.

The regulator 814 generates power to be supplied to each circuit in the main body 81. The motor 812 is a three-phase brushed direct-current motor. The drive circuit 813 is a circuit configured to flow electric current to the motor 812. The trigger switch 816 is switched to ON when a user pulls a trigger (not shown), and transmits a trigger ON-signal to the control circuit 811. When receiving the trigger ON-signal, the control circuit 811 controls the drive circuit 813 to rotate the motor 812. In addition, when receiving an input of a discharge stop signal from the second tool signal input terminal 819, the control circuit 811 controls the drive circuit 813 to stop the rotation of the motor 812. When receiving the input of the discharge stop signal from the second tool signal input terminal 819, the stop circuit 815 controls the drive circuit 813 to stop the motor 812 without involving the control circuit 811. The stop circuit 815 is a circuit for emergency. The motor 812 may be a three-phase brushless motor.

The adapter portion 82 includes a regulator 822 and a conversion circuit 821. Also, the adapter portion 82 includes various terminals on an adapter portion side. The terminals on the adapter portion side may include an adapter portion positive electrode output terminal 823, an adapter portion negative electrode output terminal 824, an adapter portion signal output terminal 825, an adapter portion positive electrode input terminal 826, an adapter portion negative electrode input terminal 827, an adapter portion first input terminal 828, an adapter portion second input terminal 829, and an adapter portion signal input terminal 830.

The adapter portion positive electrode input terminal 826 is connected to the second tool positive electrode input terminal 817 of the main body 81 via the adapter portion positive electrode output terminal 823. The adapter portion negative electrode input terminal 827 is connected to the second tool negative electrode input terminal 818 of the main body 81 via the adapter portion negative electrode output terminal 824. The adapter portion signal input terminal 830 is connected to the second tool signal input terminal 819 of the main body 81 via the conversion circuit 821 and the adapter portion signal output terminal 825. The adapter portion first input terminal 828 and the adapter portion second input terminal 829 are connected by a connection line 831.

The regulator 822 generates power to be supplied to the conversion circuit 821. The conversion circuit 821 converts the discharge permission signal or the discharge stop signal input from the adapter portion signal input terminal 830 so as to be adapted to a logic and signal level of the main body 81, and outputs it from the adapter portion signal output terminal 825.

The attachment portion 84 includes a second tool positive electrode terminal 841 that is a terminal on a positive electrode side, and a second tool negative electrode terminal 842 that is a terminal on a negative electrode side, and a second tool communication terminal 843. The second tool positive electrode terminal 841, the second tool negative electrode terminal 842, and the second tool communication terminal 843 are respectively connected to the adapter portion positive electrode input terminal 826, the adapter portion negative electrode input terminal 827, and the adapter portion signal input terminal 830 of the adapter portion 82.

Figure 8:
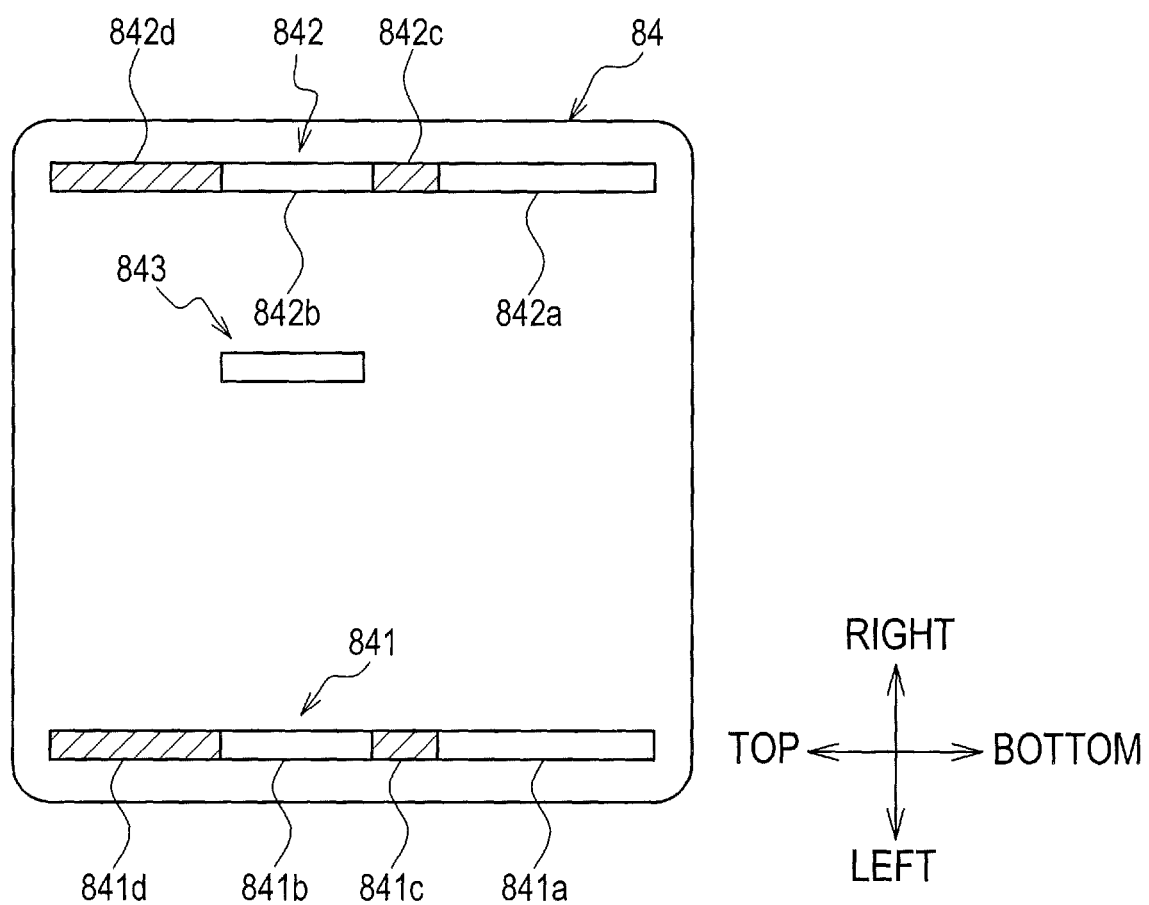
FIG. 8 is a schematic view showing a configuration of an attachment portion of the second electric working machine in the first embodiment.

FIG. 8 is a plan view of the attachment portion 84 seen from the front side, and shows a surface opposite to the terminal portion 15 of the battery pack 10. Each of the second tool positive electrode terminal 841, the second tool negative electrode terminal 842, and the second tool communication terminal 843 is a plate-shaped member and includes a conductive metal region and an insulating resin region where metal is covered by resin.

Figure 9:
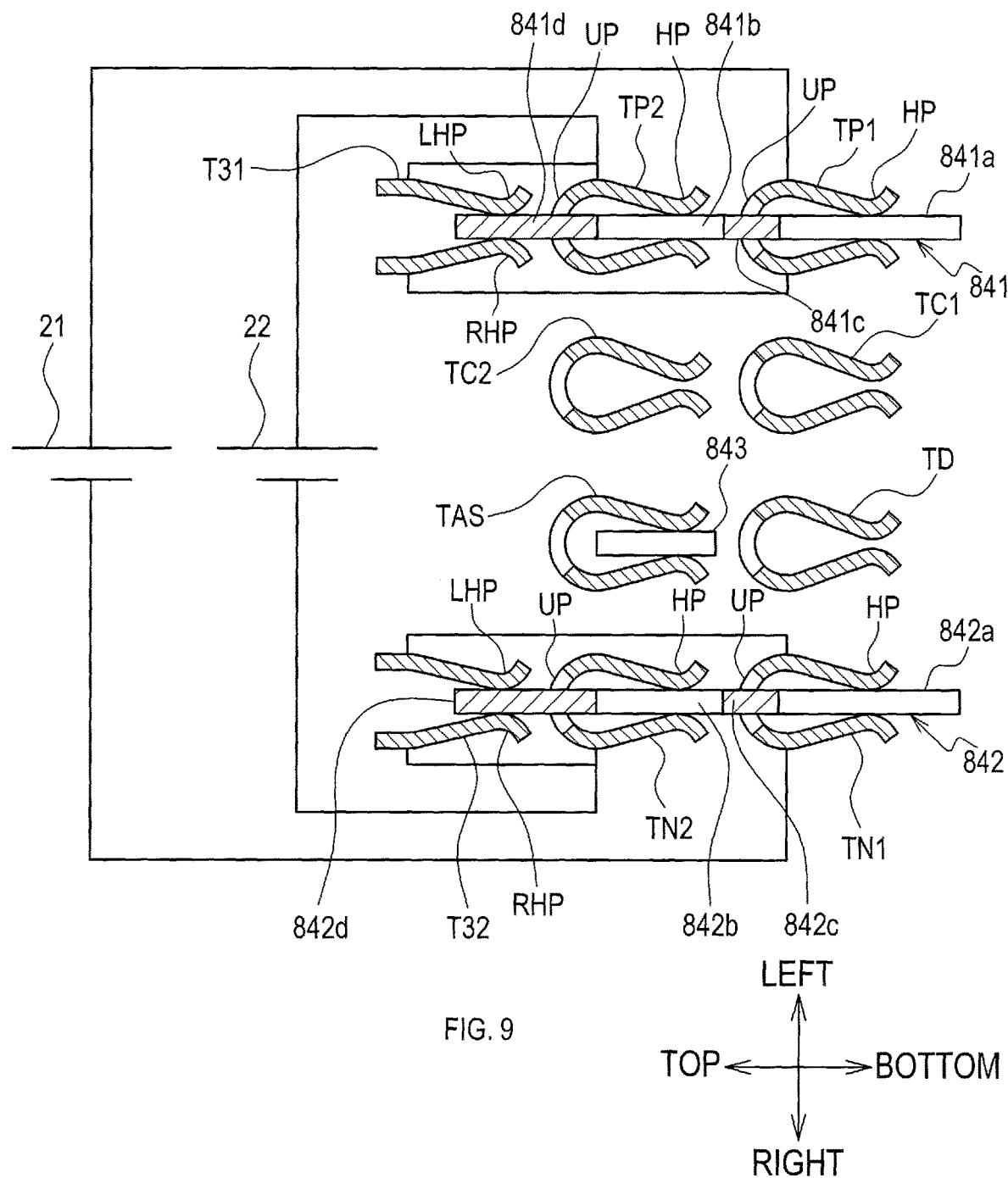
FIG. 9 is a schematic view showing a state where the attachment portion of the second electric working machine is attached to the terminal portion of the battery pack in the first embodiment.

As shown in FIG. 9, the second tool positive electrode terminal 841 is arranged at a position corresponding to the first insertion slot 11, and inserted into the first insertion slot 11. The second tool positive electrode terminal 841 is configured to have a length to penetrate the first positive electrode terminal TP1 and the second positive electrode terminal TP2 and enter between the recessed portions LHP, RHP of the first parallel connection terminal T31.

In addition, the second tool positive electrode terminal 841 includes a first positive electrode conduction portion 841*a*, a second positive electrode conduction portion 841*b*, a first positive electrode insulated portion 841*c*, and a second positive electrode insulated portion 841*d*. The first positive electrode conduction portion 841*a* is arranged at a position corresponding to a lower end in the second tool positive electrode terminal 841 and corresponding to the recessed portion HP of the first positive electrode terminal TP1. The first positive electrode insulated portion 841*c* is arranged at a position adjacent to the first positive electrode conduction portion 841*a* on an upper side thereof and corresponding to a slot UP on an upper side of the first positive electrode terminal TP1. The second positive electrode conduction portion 841*b* is arranged at a position adjacent to the first positive electrode insulated portion 841*c* on an upper side thereof and corresponding to the recessed portion HP of the second positive electrode terminal TP2. The second positive electrode insulated portion 841*d* is arranged at a position adjacent to the second positive electrode conduction portion 841*b* on an upper side thereof and corresponding to a slot UP on an upper side of the second positive electrode terminal TP2 and the recessed portions LHP, RHP of the first parallel connection terminal T31.

The second tool negative electrode terminal 842 includes a first negative electrode conduction portion 842*a*, a second negative electrode conduction portion 842*b*, a first negative electrode insulated portion 842*c*, and a second negative electrode insulated portion 842*d*. The first negative electrode conduction portion 842*a* is arranged at a position corresponding to a lower end in the second tool negative electrode terminal 842 and the recessed portion HP of the first negative electrode terminal TN1. The first negative electrode insulated portion 842*c* is arranged at a position adjacent to the first negative electrode conduction portion 842*a* on an upper side thereof and corresponding to a slot UP on an upper side of the first negative electrode terminal TN1. The second negative electrode conduction portion 842*b* is arranged at a position adjacent to the first negative electrode insulated portion 842*c* on an upper side thereof and corresponding the recessed portion HP of the second negative electrode terminal TN2. The second negative electrode insulated portion 842*d* is arranged at a position adjacent to the second negative electrode conduction portion 842*b* on an upper side thereof and corresponding to a slot UP on an upper side of the second negative electrode terminal TN2 and the recessed portions LHP, RHP of the second parallel connection terminal T32.

Figure 7:
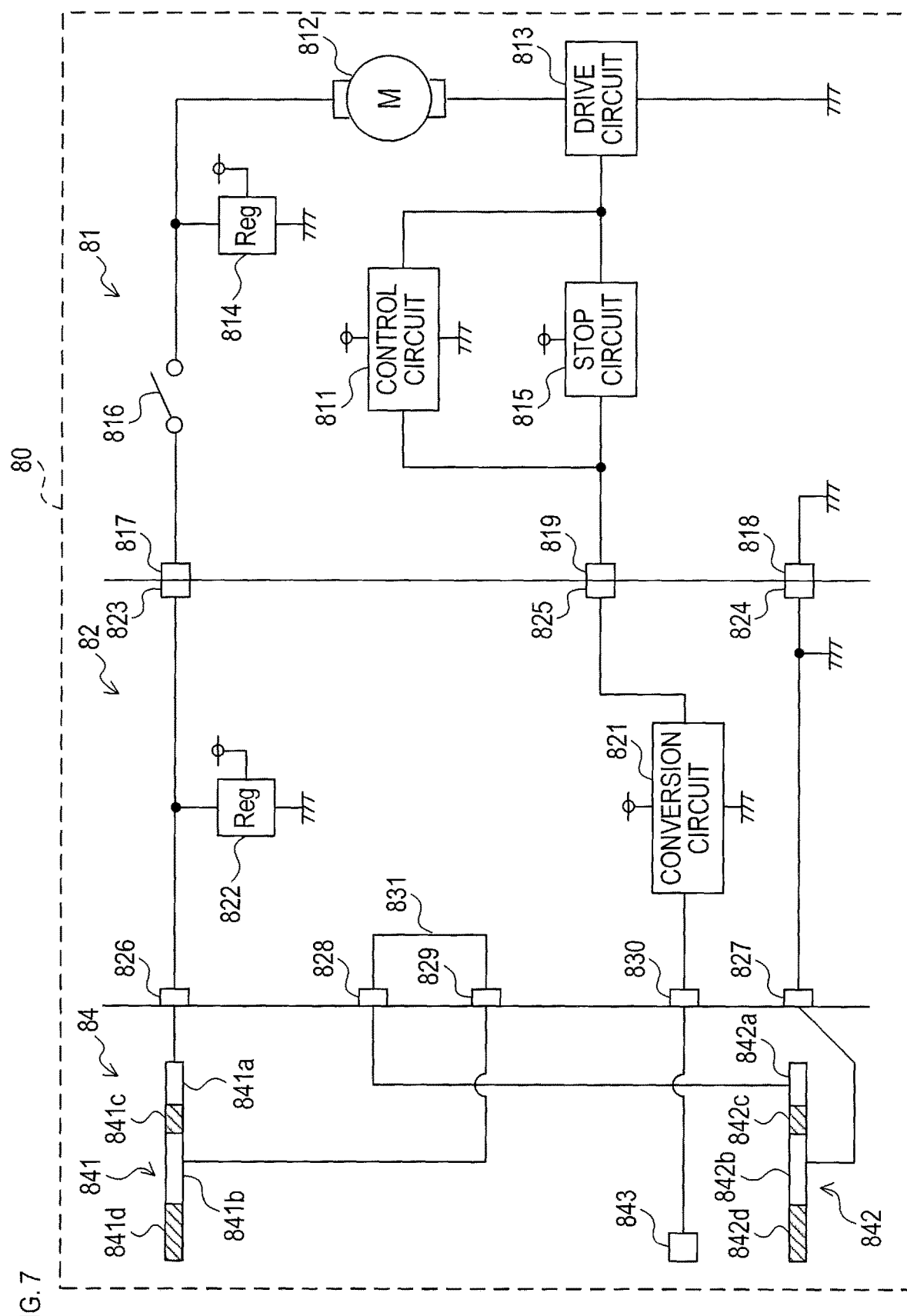
FIG. 7 is a block diagram showing a configuration of a second electric working machine in the first embodiment.

As shown in FIG. 7, the first positive electrode conduction portion 841*a* is connected to the adapter portion positive electrode input terminal 826, and the second positive electrode conduction portion 841*b* is connected to the adapter portion second input terminal 829. Also, the first negative electrode conduction portion 842*a* is connected to the adapter portion first input terminal 828, and the second negative electrode conduction portion 842*b* is connected to the adapter portion negative electrode input terminal 827.

The second tool positive electrode terminal 841 and the second tool negative electrode terminal 842 are configured to have a longer length in the top-bottom direction than the first tool positive electrode terminal 781 and the first tool negative electrode terminal 782 of the first electric working machine 70. Also, the second tool communication terminal 843 is configured to be similar to the first tool communication terminal 783 of the first electric working machine 70.

As shown in FIG. 9, when the attachment portion 84 is attached to the terminal portion 15, the first positive electrode conduction portion 841*a* and the first positive electrode terminal TP1 are electrically connected, and the second positive electrode conduction portion 841*b* and the second positive electrode terminal TP2 are electrically connected. And the first positive electrode terminal TP1 and the second positive electrode terminal TP2 are electrically disconnected by the first positive electrode insulated portion 841*c*. The first member T31*a* and the second member T31*b* of the first parallel connection terminal T31 are electrically disconnected by the second positive electrode insulated portion 841*d*.

When the first negative electrode conduction portion 842*a* and the first negative electrode terminal TN1 are electrically connected, the second negative electrode conduction portion 842*b* and the second negative electrode terminal TN2 are electrically connected. And the first negative electrode terminal TN1 and the second negative electrode terminal TN2 are electrically disconnected by the first negative electrode insulated portion 842*c*. The first member T32*a* and the second member T32*b* of the second parallel connection terminal T32 are electrically disconnected by the second negative electrode insulated portion 842*d*.

Also, the second tool communication terminal 843 and the first communication terminal TAS are electrically connected.

Thus, when the attachment portion 84 is attached to the terminal portion 15, the battery block 21 and the battery block 22 are disconnected and independent to each other, and the first voltage of the battery block 21 and the second voltage of the battery block 22 are output independently from the terminal portion 15 of the battery pack 10 to the second electric working machine 80. The first voltage of the battery block 21 is input between the adapter portion positive electrode input terminal 826 and the adapter portion first input terminal 828, and the second voltage of the battery block 22 is input between the adapter portion second input terminal 829 and the adapter portion negative electrode input terminal 827.

Here, the adapter portion first input terminal 828 and the adapter portion second input terminal 829 are connected by the connection line 831. Thus, a sum voltage that is a sum of the first voltage of the battery block 21 and the second voltage of the battery block 22 is applied between the adapter portion positive electrode input terminal 826 and the adapter portion negative electrode input terminal 827. Consequently, the sum voltage that is the sum of the first voltage of the battery block 21 and the second voltage the battery block 22 is input between the second tool positive electrode input terminal 817 and the second tool negative electrode input terminal 818 of the main body 81. Thus, the second electric working machine 80 can use the sum voltage that is approximately twice as much as each first voltage and the second voltage of the battery blocks 21, 22.

In the present embodiment, the second tool positive electrode terminal 841 and the second tool negative electrode terminal 842 correspond to one example of a second connection terminal of the present disclosure. Also, the connection line 831 corresponds to one example of an adder of the present disclosure.

<1-4. Configuration of Charger>

Figure 10:
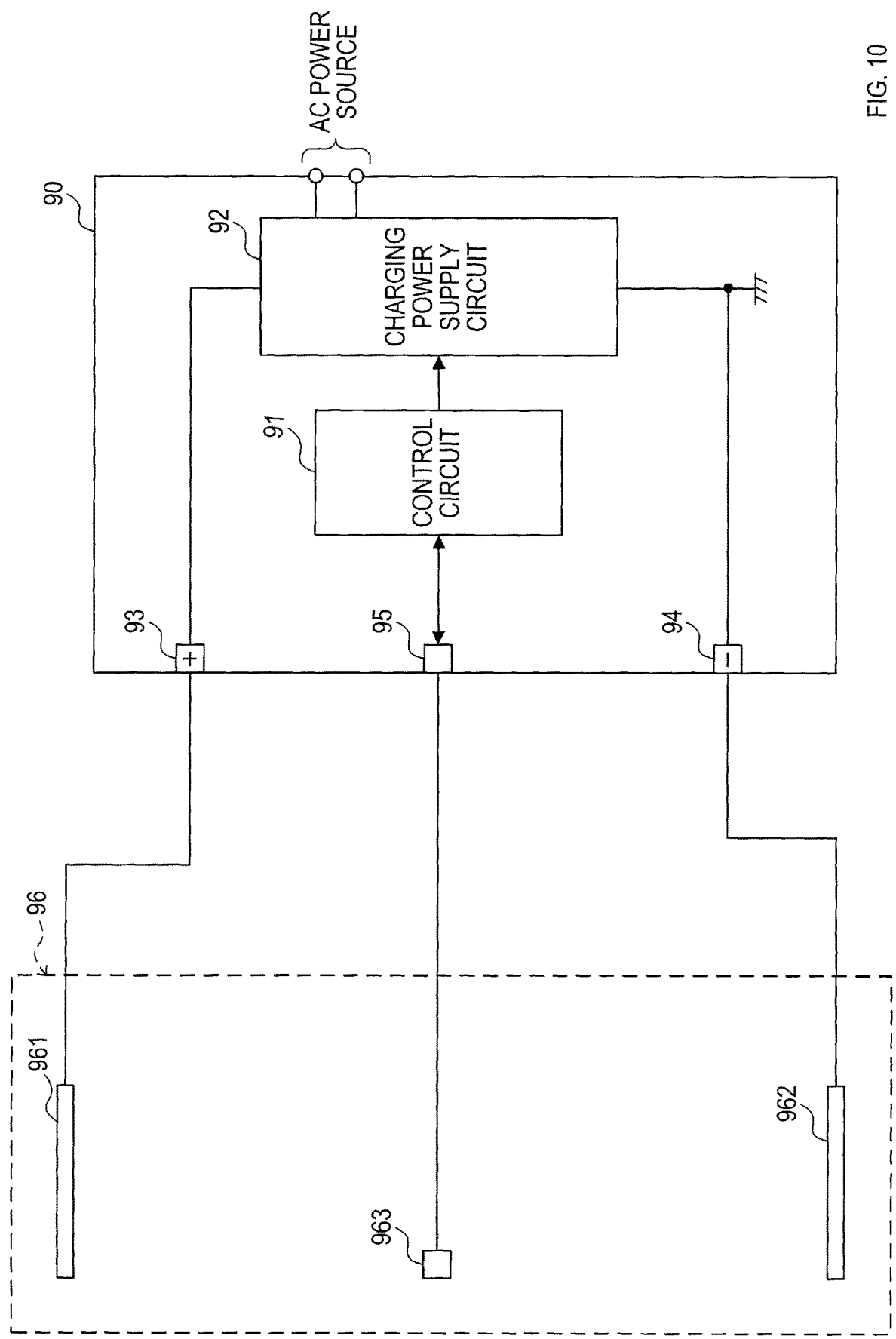
FIG. 10 is a block diagram showing a configuration of a charger in the first embodiment.

Next, a description will be given of a schematic configuration of the charger 90 with reference to FIG. 10 and FIG. 11.

The charger 90 includes a control circuit 91, a charging power supply circuit 92, an attachment portion 96, a charging circuit positive electrode terminal 93, a charging circuit negative electrode terminal 94 and a charging circuit communication terminal 95.

The control circuit 91 controls the charging power supply circuit 92 based on battery information input via the charging circuit communication terminal 95. The charging power supply circuit 92 is connected to commercial AC power source. In response to a command from the control circuit 91, the charging power supply circuit 92 generates direct-current power source from the AC power source, and supplies the generated direct-current power source to the battery pack 10 via the charging circuit positive electrode terminal 93 and the charging circuit negative electrode terminal 94.

The attachment portion 96 is attached to the terminal portion 15 of the battery pack 10. The attachment portion 96 includes a first charger positive electrode terminal 961, a first charger negative electrode terminal 962, and a first charger communication terminal 963. The first charger positive electrode terminal 961, the first charger negative electrode terminal 962, and the first charger communication terminal 963 are respectively connected to the charging circuit positive electrode terminal 93, the charging circuit negative electrode terminal 94, and the charging circuit communication terminal 95.

Figure 11:
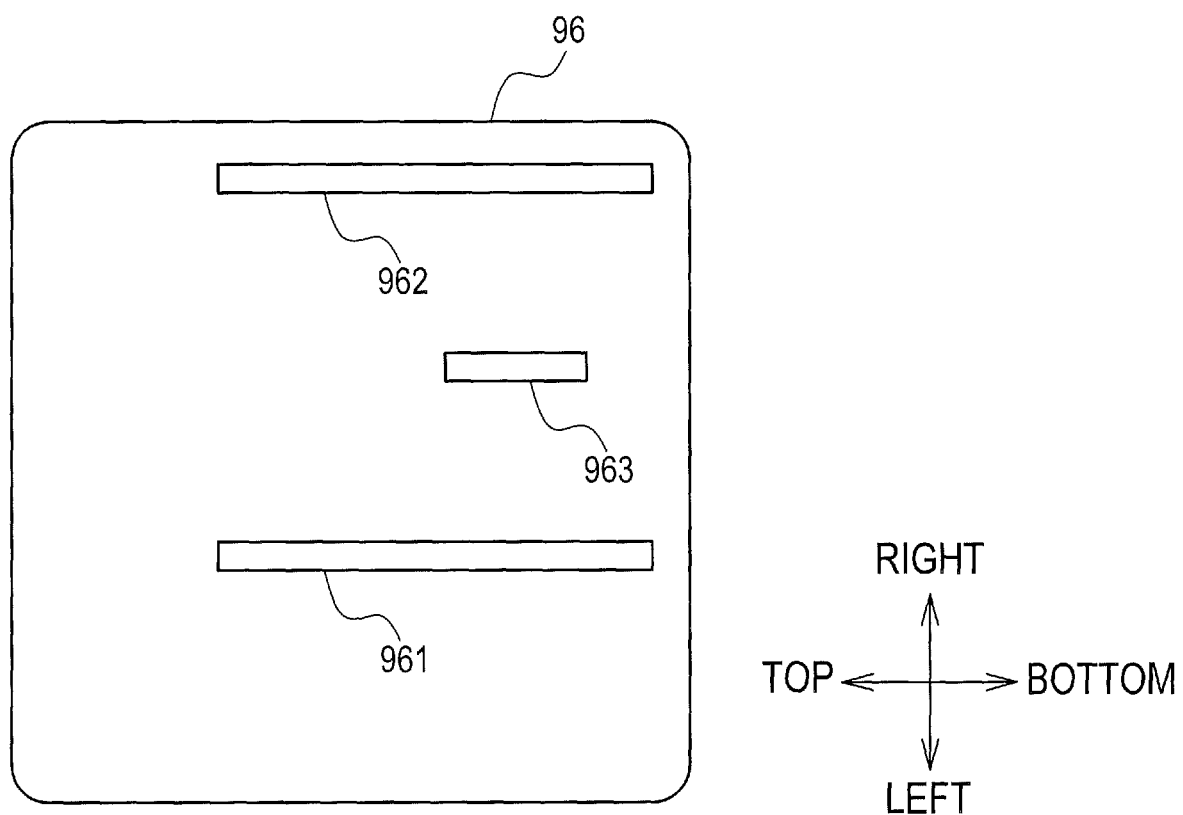
FIG. 11 is a schematic view showing a configuration of an attachment portion of the charger in the first embodiment.

FIG. 11 is a plan view of the attachment portion 96 seen from the front, and shows a surface opposite to the terminal portion 15 of the battery pack 10. Each of the first charger positive electrode terminal 961, the first charger negative electrode terminal 962, and the first charger communication terminal 963 is a plate-shaped metal member. The first charger positive electrode terminal 961 is arranged at a position corresponding to the second insertion slot 12 and inserted into the second insertion slot 12. The first charger positive electrode terminal 961 is configured to have a length to penetrate the first charging terminal TC1 and enter between the recessed portions HP of the second charging terminal TC2, but not to penetrate the second charging terminal TC2.

The first charger negative electrode terminal 962 is arranged at a position corresponding to the fourth insertion slot 14, and inserted into the fourth insertion slot 14. The first charger negative electrode terminal 962 is configured to be similar to the first tool negative electrode terminal 782 of the first electric working machine 70.

The first charger communication terminal 963 is arranged at a position corresponding to the second communication terminal TD of the third insertion slot 13, and inserted into the third insertion slot 13. The first charger communication terminal 963 is configured to have a length longer than a distance from the opening end portion HP of the second communication terminal TD to the recessed portion DP of the second communication terminal TD.

When the attachment portion 96 is attached to the terminal portion 15, the first charger positive electrode terminal 961 and the first charging terminal TC1 and the second charging terminal TC2 are electrically connected. As a result, the charging circuit positive electrode terminal 93 is electrically connected to the positive electrodes of the battery blocks 21, 22. The first charger negative electrode terminal 962 is electrically connected to the first negative electrode terminal TN1 and the second negative electrode terminal TN2. As a result, the charging circuit negative electrode terminal 94 is electrically connected to the negative electrodes of the battery blocks 21, 22.

The first member T31a and the second member T31b of the first parallel connection terminal T31 are connected, and the first member T32a and the second member T32b of the second parallel connection terminal T32 are connected. Thus, when the attachment portion 96 is attached to the terminal portion 15, the battery block 21 and the battery block 22 are connected in parallel by the first parallel connection terminal T31 and the second parallel connection terminal T32, and the battery block 21 and the battery block 22 are charged in a state of being connected in parallel.

Also, when the attachment portion 96 is attached to the terminal portion 15, the first charger communication terminal 963 and the second communication terminal TD are electrically connected.

<1-6. Effects>

The first embodiment as described above achieves the following effects:

(1) When the attachment portion 78 of the first electric working machine 70 is attached to the terminal portion 15, the battery blocks 21, 22 are connected in parallel. With this configuration, the first voltage and the second voltage of the battery blocks 21, 22, which are connected in parallel, is output from the battery pack 10 to the first electric working machine 70, and the first electric working machine 70 can use a relatively low parallel voltage. When the attachment portion 84 of the second electric working machine 80 is attached to the terminal portion 15, the battery blocks 21, 22 are disconnected and independent to each other. With this configuration, the first voltage of the battery block 21 and the second voltage of the battery block 22 are output independently from the battery pack 10 to the second electric working machine 80, and the second electric working machine 80 can freely combine and use multiple output voltages.

(2) It is avoided to output a high voltage from the battery pack 10 by connecting the battery blocks 21, 22 in series in the battery pack 10. This can simplify an insulation structure of the battery pack 10, and achieves reduction in size of the battery pack 10.

(3) When a target device is not connected to the terminal portion 15, the battery blocks 21, 22 are connected in parallel. This can balance the voltage of the battery block 21 and the voltage of the battery block 22 at the time of storing the battery pack 10.

(4) The first voltage of the battery block 21 and the second voltage of the battery block 22, which are independently input to the second electric working machine 80, are added by the connection line 831. Thus, the second electric working machine 80 can use the sum voltage higher than the first voltage of each of the battery blocks 21, 22.

(5) When the first member T31a and the second member T31b are connected and the first member T32a and the second member T32b are connected, the positive electrodes of the battery blocks 21, 22 are connected to each other and the negative electrodes of the battery blocks 21, 22 are connected to each other, and the battery blocks 21, 22 can be connected in parallel. When the first member T31a and the second member T31b are disconnected and the first member T32a and the second member T32b are disconnected, the positive electrodes of the battery blocks 21, 22 can be electrically disconnected from each other, and the negative electrodes of the battery blocks 21, 22 can be electrically disconnected from each other.

(6) By charging the battery pack while the battery blocks 21, 22 are connected in parallel, the output voltage of the charger 90 can be lowered compared to the case of charging the battery pack while the battery blocks 21, 22 are connected in series. Consequently, it is possible to simplify the insulation structure of the charger 90 and reduce the size thereof.

(7) By collecting battery information of the battery blocks 21, 22 and transmitting it by the single microcomputer 30, it is possible to reduce the number of microcomputer to be mounted on the battery pack 10, and reduce a physical size of the battery pack 10.

(8) The adapter portion 82 is connected to the main body 81 of the second electric working machine 80. Thus, even if the main body 81 is configured not to be directly applicable to the battery pack 10, the main body 81 can be used with the battery pack 10.

(9) Since the adapter portion 82 includes the connection line 831, the main body 81 can use the sum voltage that is a sum of the first voltage of the battery block 21 and the second voltage of the battery block 22 even when the main body 81 does not have a function of adding the first voltage of the battery block 21 and the second voltage of the battery block 22.

(10) With the discharge reverse flow prevention FETs 531, 532 and the semiconducting resistors 511, 512, a semiconducting state is brought between the positive electrode of the battery block 21 and the first positive electrode terminal TP1, and between the positive electrode of the battery block 22 and the second positive electrode terminal TP2 at the time of storing the battery pack 10. Thus, even when the voltage difference between the battery blocks 21, 22 is relatively large, it is possible to inhibit an excessive electric current from flowing from a battery block having a high voltage to a battery block having a low voltage. Consequently, failure of the battery pack 10 can be reduced.

Second Embodiment

<2-1. Differences from First Embodiment>

Since a second embodiment has a similar basic configuration to that of the first embodiment, a common configuration will not be further described and differences will be mainly described. The same reference numerals as in the first embodiment represent the same configuration, and reference will be made to the previous descriptions thereof.

In the second embodiment, a configuration of a second electric working machine 80A is different from the configuration of the second electric working machine 80 in the first embodiment. The configuration of the battery system other than the above are the same as those of the first embodiment.

Figure 12:
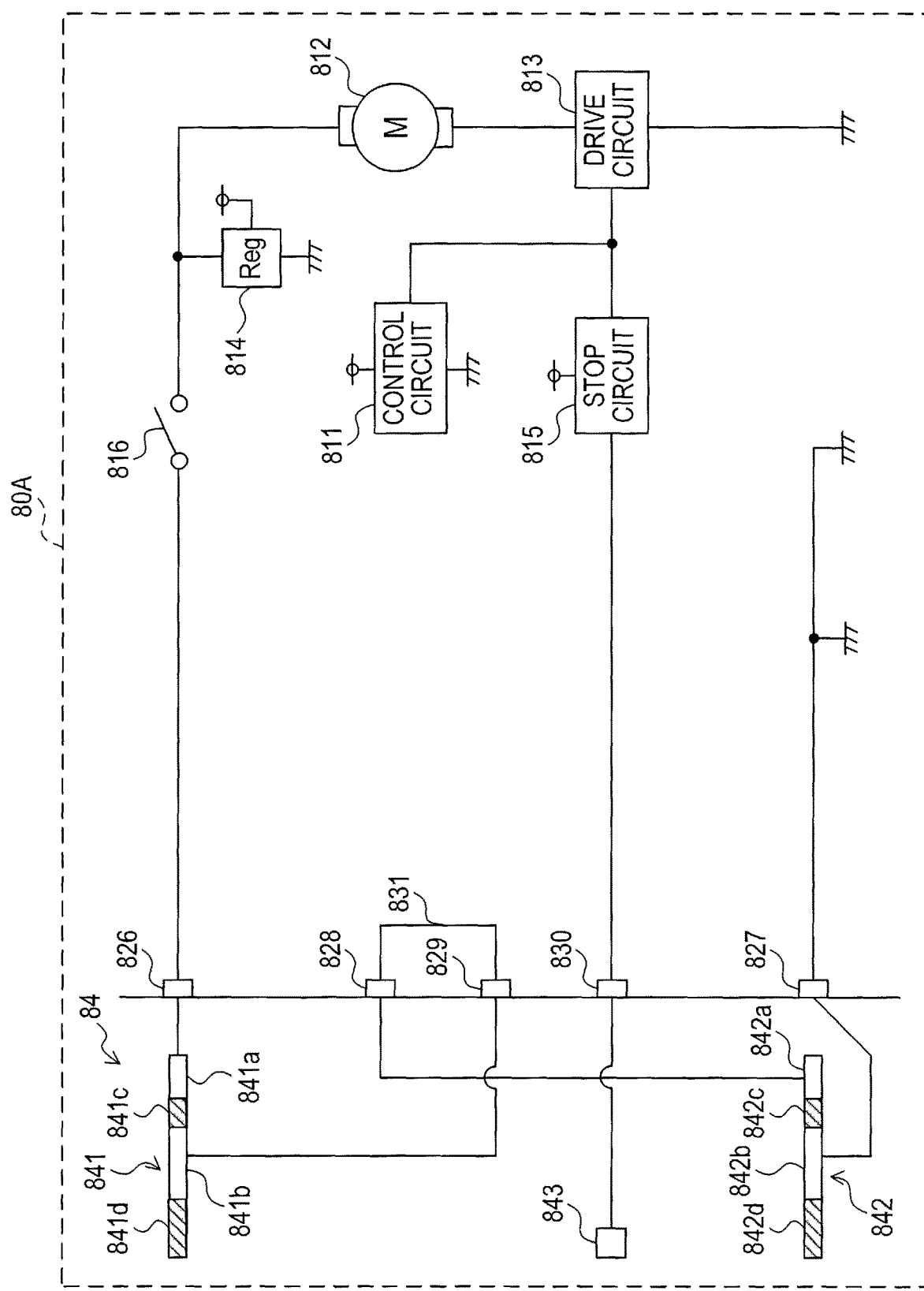
FIG. 12 is a block diagram showing a configuration of a second electric working machine in a second embodiment.

As shown in FIG. 12, the second electric working machine 80A is configured such that the adapter portion 82 of the second electric working machine 80 is included inside the main body 81. Thus, the second electric working machine 80A does not include the second tool positive electrode input terminal 817, the second tool negative electrode input terminal 818, the second tool signal input terminal 819, the adapter portion positive electrode output terminal 823, the adapter portion negative electrode output terminal 824, the adapter portion signal output terminal 825, or the conversion circuit 821.

<2-2. Effects>

According to the second embodiment as described above, the effects from (1) to (7) and (10) of the first embodiment described above can be achieved.

Third Embodiment

<3-1. Differences from First Embodiment]

Since the basic configuration of a third embodiment is similar to that of the first embodiment, a common configuration will not be further described and differences will be mainly described. The same reference numerals as in the first embodiment represent the same configuration, and reference will be made to the previous descriptions thereof.

In the third embodiment, a configuration of a second electric working machine 80B is different from the configuration of the second electric working machine 80 in the first embodiment. The configuration of the battery system other than the above are the same as those of the first embodiment.

Figure 13:
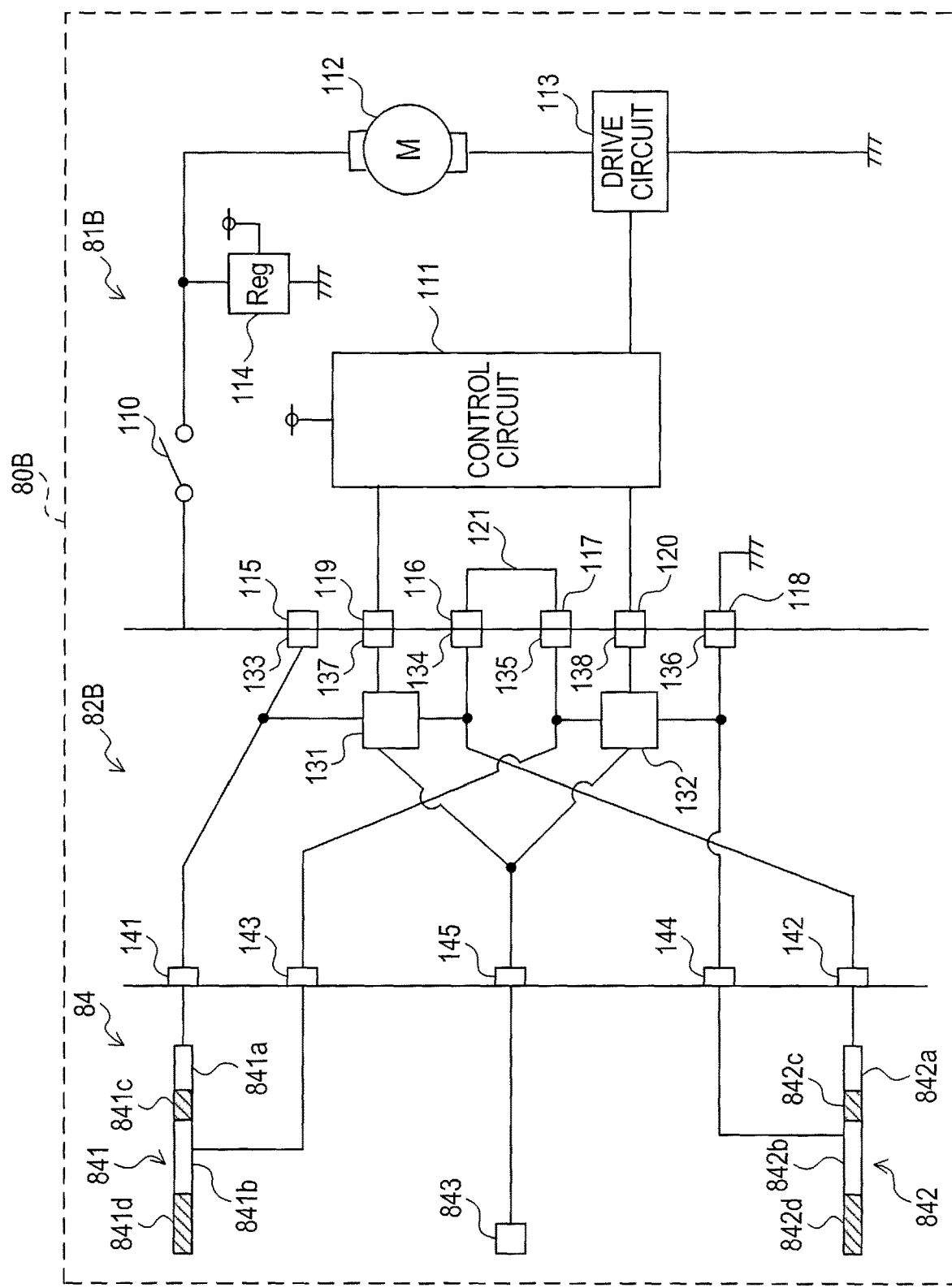
FIG. 13 is a block diagram showing a configuration of a second electric working machine in a third embodiment.

As shown in FIG. 13, the second electric working machine 80B includes a main body 81B, an adapter portion 82B, and the attachment portion 84. The main body 81B is originally configured to be used by connecting two battery packs.

The main body 81B includes a motor 112, a drive circuit 113, a regulator 114, a control circuit 111, and a trigger switch 110. Also, the main body 81B includes a third tool positive electrode input terminal 115, a third tool upper input terminal 116, a third tool upper signal input terminal 119, a third tool lower input terminal 117, a third tool negative electrode input terminal 118, and a third tool lower signal input terminal 120, which are terminals on the main body side. And, the third tool upper input terminal 116 and the third tool lower input terminal 117 are connected by a connection line 121.

The third tool positive electrode input terminal 115, the third tool upper input terminal 116, and the third tool upper signal input terminal 119 are originally configured to be connected to a first battery pack of the two battery packs. Also, the third tool lower input terminal 117, the third tool negative electrode input terminal 118, and the third tool lower signal input terminal 120 are originally configured to be connected to a second battery pack of the two battery packs. The second electric working machine 80B is configured to connect the output voltages of the two battery packs by the connection line 121 to use electric power that is a sum of the output voltages of the two battery packs.

The regulator 114 generates power to be supplied to each circuit in the main body 81B. The motor 112 is a three-phase brushed direct-current motor. The drive circuit 113 is a circuit configured to flow electric current to the motor 112. The trigger switch 110 is switched to ON when a user pulls a trigger (not shown), and transmits a trigger ON-signal to the control circuit 111. When receiving the trigger ON-signal, the control circuit 111 controls the drive circuit 113 to rotate the motor 112. Also, when the discharge stop signal is input from at least one of the third tool upper signal input terminal 119 and the third tool lower signal input terminal 120, the control circuit 111 controls the drive circuit 113 to stop the rotation of the motor 112. The motor 112 may be a three-phase brushless motor.

The adapter portion 82B includes conversion circuits 131, 132 and various terminals on an adapter portion side. The terminals on the adapter portion side include an adapter portion positive electrode output terminal 133, an adapter portion first output terminal 134, an adapter portion first signal output terminal 137, an adapter portion second output terminal 135, an adapter portion negative electrode output terminal 136, an adapter portion second signal output terminal 138, an adapter portion positive electrode input terminal 141, an adapter portion negative electrode input terminal 142, an adapter portion first input terminal 143, an adapter portion second input terminal 144, and an adapter portion signal input terminal 145.

The adapter portion positive electrode input terminal 141 is connected to the third tool positive electrode input terminal 115 of the main body 81B via the adapter portion positive electrode output terminal 133. The adapter portion first input terminal 143 is connected to the third tool lower input terminal 117 of the main body 81B via the adapter portion second output terminal 135. The adapter portion second input terminal 144 is connected to the third tool negative electrode input terminal 118 of the main body 81B via the adapter portion negative electrode output terminal 136. The adapter portion negative electrode input terminal 142 is connected to the third tool upper input terminal 116 of the main body 81B via the adapter portion first output terminal 134.

The adapter portion signal input terminal 145 is connected to the third tool upper signal input terminal 119 of the main body 81B via the conversion circuit 131 and the adapter portion first signal output terminal 137. Furthermore, the adapter portion signal input terminal 145 is connected to the third tool lower signal input terminal 120 of the main body 81B via the conversion circuit 132 and the adapter portion second signal output terminal 138. Since the main body 81B is provided with two signal input terminals 119, 120, the signal that is input from the adapter portion signal input terminal 145 is divided into two, and the two signals are input to the two signal input terminals 119, 120.

As shown in FIG. 13, the first positive electrode conduction portion 841a is connected to the adapter portion positive electrode input terminal 141, and the second positive electrode conduction portion 841b is connected to the adapter portion first input terminal 143. Also, the first negative electrode conduction portion 842a is connected to the adapter portion negative electrode input terminal 142, and the second negative electrode conduction portion 842b is connected to the adapter portion second input terminal 144.

Accordingly, when the attachment portion 84 of the second electric working machine 80B is attached to the terminal portion 15, the first voltage of the battery block 21 is input between the third tool positive electrode input terminal 115 and the third tool upper input terminal 116. The second voltage of the battery block 22 is input between the third tool lower input terminal 117 and the third tool negative electrode input terminal 118. Thus, the second electric working machine 80B can use the sum voltage that is a sum of the first voltage of the battery block 21 and the second voltage of the battery block 22 similar to the case where the two battery packs are directly connected to the main body 81B.

In the present embodiment, the connection line 121 corresponds to one example of the adder of the present disclosure.

<3-2. Effect>

According to the third embodiment as described above, the effects from (1) to (8) and (10) of the first embodiment described above can be achieved.

Fourth Embodiment

Next, a description will be given of a battery system according to the fourth embodiment with reference to FIG. 14 to FIG. 20. The battery system according to the fourth embodiment includes a battery pack 10A, a first electric working machine 70A, a second electric working machine 80C, and a charger 90A.

<4-1. Configuration of Battery Pack>

Figure 14:
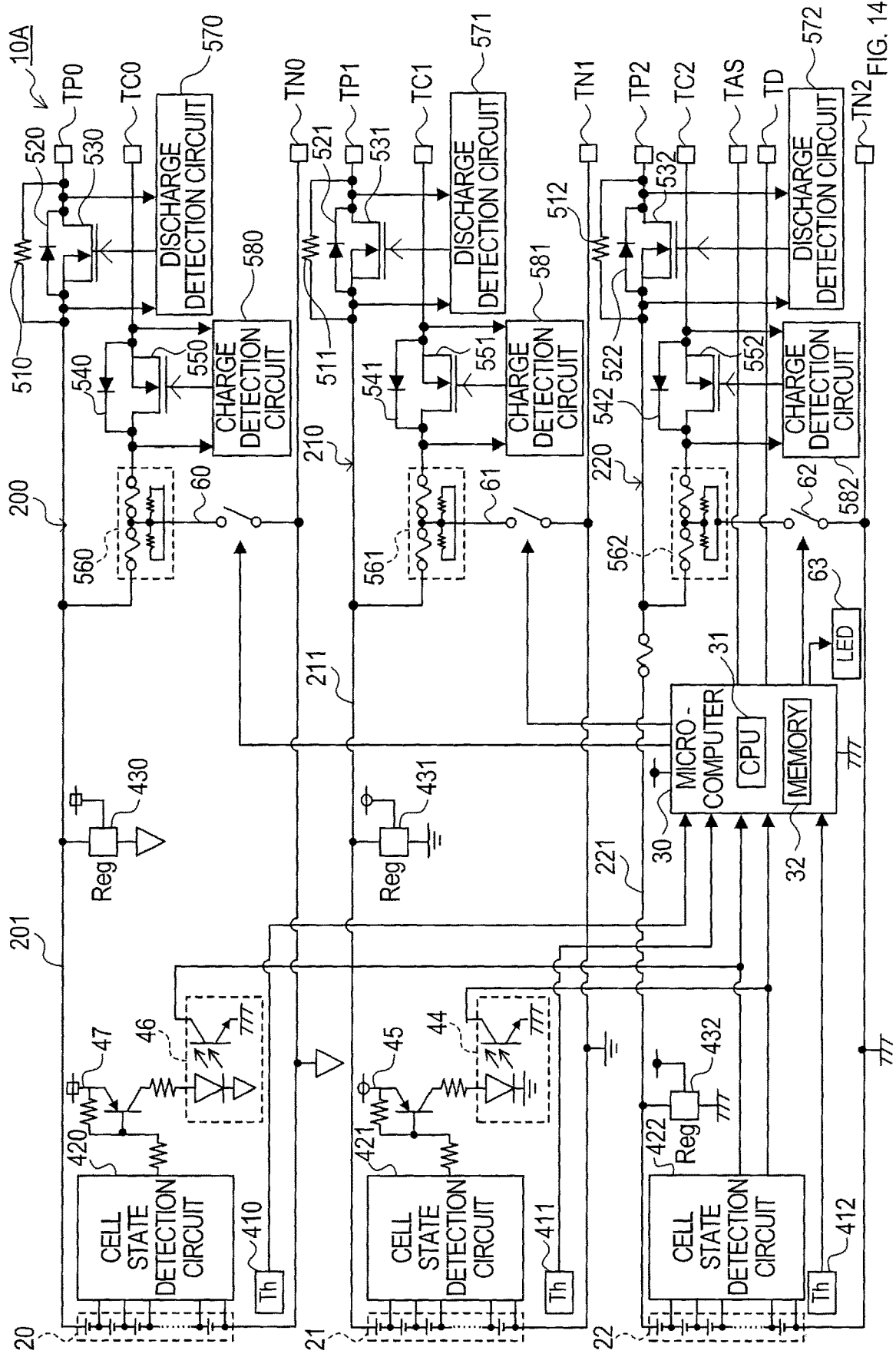
FIG. 14 is a block diagram showing a configuration of a battery pack in a fourth embodiment.

First, a description will be given of a configuration of the battery pack 10A focusing mainly on differences from the configuration of the battery pack 10 with reference to FIG. 14 and FIG. 15.

The battery pack 10A includes three battery blocks 21, 22, 20, a first battery circuit 210 connected to the battery block 21, a second battery circuit 220 connected to the battery block 22, and a third battery circuit 200 connected to the battery block 20. That is, the battery pack 10A includes more battery blocks and battery circuits than the battery pack 10.

The battery block 20 is a battery block having the same rated voltage as the battery blocks 21, 22, and is configured such that multiple battery cells are connected in series similar to the battery blocks 21, 22. Since the third battery circuit 200 has the same configuration as the first battery circuit 210, the description thereof will be omitted. The third battery circuit 200 includes a third positive electrode terminal TP0, a third negative electrode terminal TN0 and a third charging terminal TC0 instead of the first positive electrode terminal TP1, the first negative electrode terminal TN1 and the first charging terminal TC1 of the first battery circuit 210.

Figure 15:
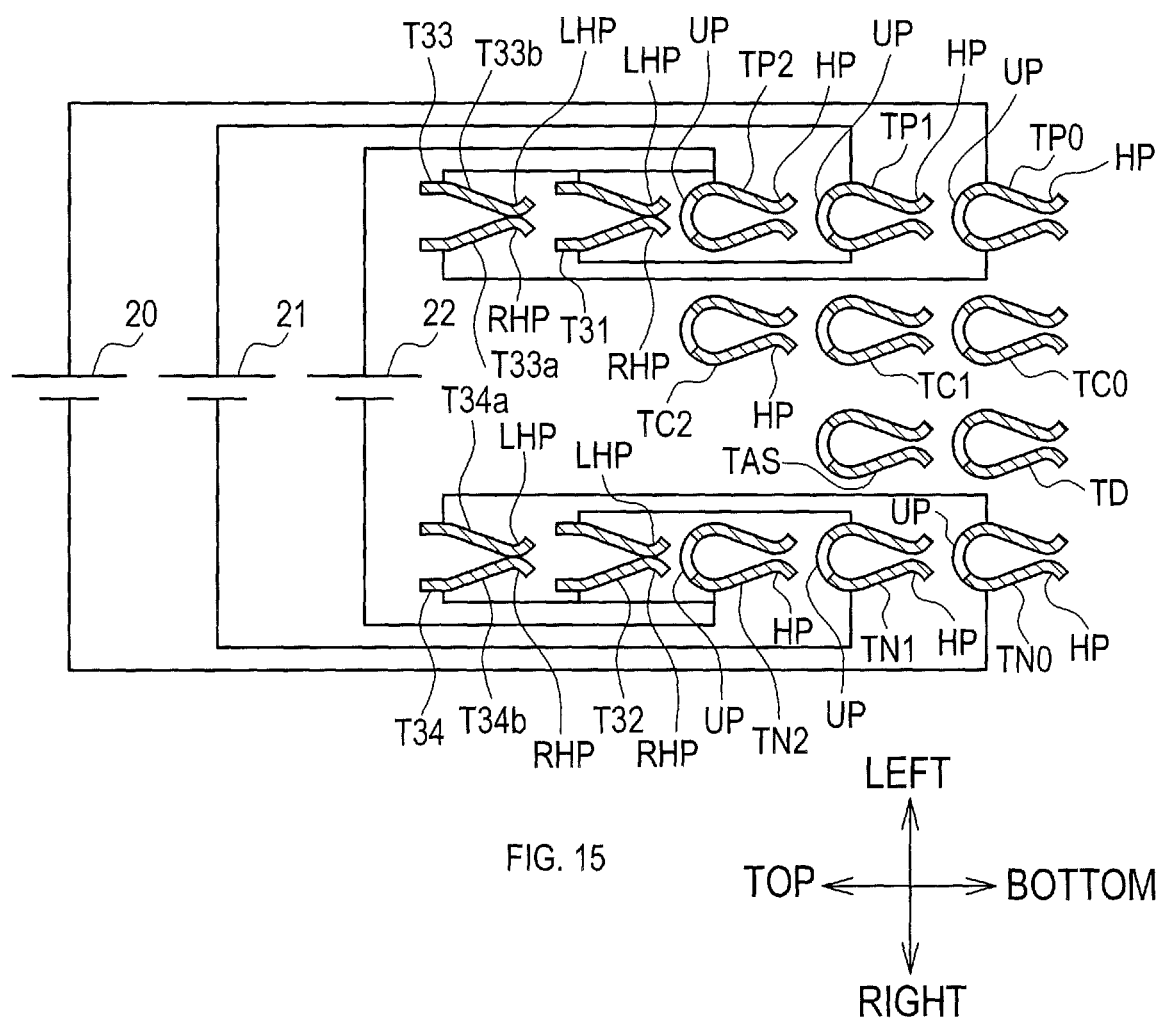
FIG. 15 is a schematic view showing a shape of each terminal in a terminal portion of the battery pack and a connecting state of a battery block and each terminal in the fourth embodiment.

FIG. 15 shows a configuration of a terminal portion 15A of the battery pack 10A. The terminal portion 15A includes, in addition to the configuration of the terminal portion 15, the third positive electrode terminal TP0, the third negative electrode terminal TN0, the third charging terminal TC0, a third parallel connection terminal T33, and a fourth parallel connection terminal T34. Each of the third positive electrode terminal TP0, the third negative electrode terminal TN0, and the third charging terminal TC0 is configured to be similar to the first positive electrode terminal TP1. Also, each of the third parallel connection terminal T33 and the fourth parallel connection terminal T34 is configured to be similar to the first parallel connection terminal T31.

In the first insertion slot 11, the third positive electrode terminal TP0, the first positive electrode terminal TP1, the second positive electrode terminal TP2, the first parallel connection terminal T31, the third parallel connection terminal T33 are arranged in this order from the bottom toward the top. In the second insertion slot 12, the third charging terminal TC0, the first charging terminal TC1, and the second charging terminal TC2 are arranged in this order from the bottom toward the top. In the third insertion slot 13, the second communication terminal TD, and the first communication terminal TAS are arranged in this order from the bottom toward the top. In the fourth insertion slot 14, the third negative electrode terminal TN0, the first negative electrode terminal TN1, the second negative electrode terminal TN2, the second parallel connection terminal T32, and the fourth parallel connection terminal T34 are arranged in this order from the bottom toward the top.

A first member T33a of the third parallel connection terminal T33 is connected to the third positive electrode terminal TP0, and the third positive electrode terminal TP0 is connected to a positive electrode of the battery block 20. The second member T33b of the third parallel connection terminal T33 is connected to the second positive electrode terminal TP2, and the second positive electrode terminal TP2 is connected to a positive electrode of the battery block 22. Accordingly, by connecting the first member T31a and the second member T31b of the first parallel connection terminal T31 and by connecting the first member T33a and the second member T33b of the third parallel connection terminal T33, each positive electrode of the battery blocks 20, 21, 22 is connected to each other. By disconnecting the first member T31a and the second member T31b of the first parallel connection terminal T31 and by disconnecting the first member T33a and the second member T33b of the third parallel connection terminal T33, each positive electrode of the battery blocks 20, 21, 22 is disconnected from each other.

A first member T34a of the fourth parallel connection terminal T34 is connected to the third negative electrode terminal TN0, and the third negative electrode terminal TN0 is connected to a negative electrode of the battery block 20. A second member T34b of the fourth parallel connection terminal T34 is connected to the second negative electrode terminal TN2, and the second negative electrode terminal TN2 is connected to a negative electrode of the battery block 22. Accordingly, by connecting the first member T32a and the second member T32b of the second parallel connection terminal T32 and by connecting the first member T34a and the second member T34b of the fourth parallel connection terminal T34, each negative electrode of the battery blocks 20, 21, 22 is connected to each other. In addition, by disconnecting the first member T32a and the second member T32b of the second parallel connection terminal T32 and by disconnecting the first member T34a and the second member T34b of the fourth parallel connection terminal T34, each negative electrode of the battery blocks 20, 21, 22 is disconnected from each other. Thus, when a target device is not connected to the terminal portion 15, the battery blocks 20, 21, 22 are connected in parallel.

In the present embodiment, the first positive electrode terminal TP1, the third positive electrode terminal TP0, the first negative electrode terminal TN1, and the third negative electrode terminal TN0 correspond to one example of a first output terminal of the present disclosure. The second positive electrode terminal TP2 and the second negative electrode terminal TN2 correspond to one example of a second output terminal of the present disclosure. Also, the first parallel connection terminal T31, the second parallel connection terminal T32, the third parallel connection terminal T33, the fourth parallel connection terminal T34 correspond to one example of a parallel connection terminal of the present disclosure. In the present embodiment, the discharge reverse flow prevention FET 531 and the semiconducting resistor 511, the discharge reverse flow prevention FET 532 and the semiconducting resistor 512, and the discharge reverse flow prevention FET 530 and the semiconducting resistor 510 correspond to one example of a switcher of the present disclosure.

<4-2. Configuration of First Electric Working Machine>

A description will be given of a configuration of the first electric working machine 70A according to the fourth embodiment focusing mainly on differences from the first electric working machine 70. The first electric working machine 70A includes an attachment portion 78A different from the attachment portion 78 of the first electric working machine 70. The attachment portion 78A is attached to the terminal portion 15A of the battery pack 10A.

Figure 16:
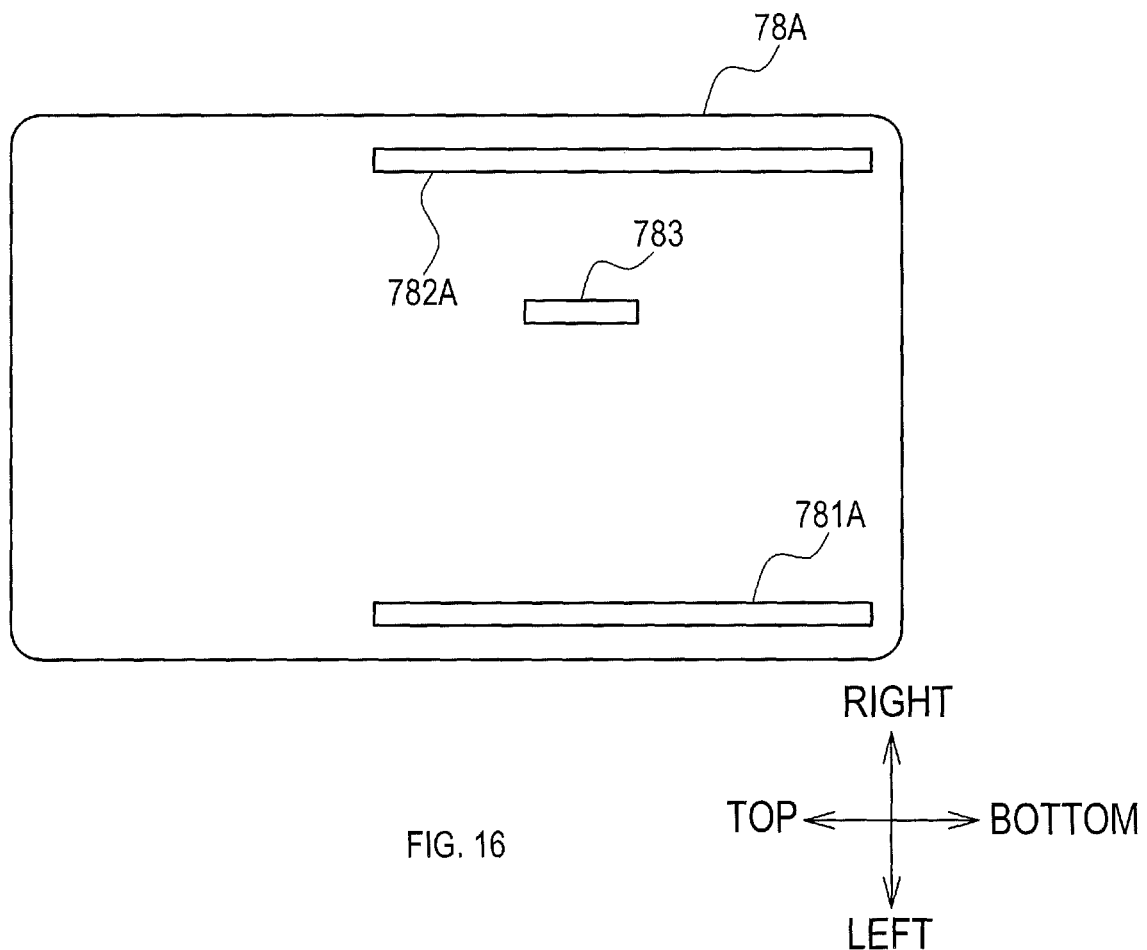
FIG. 16 is a schematic view showing a configuration of an attachment portion of a first electric working machine in the fourth embodiment.

As shown in FIG. 16, the attachment portion 78A includes a fourth tool positive electrode terminal 781A and a fourth tool negative electrode terminal 782A instead of the first tool positive electrode terminal 781 and the first tool negative electrode terminal 782 of the attachment portion 78.

Figure 17:
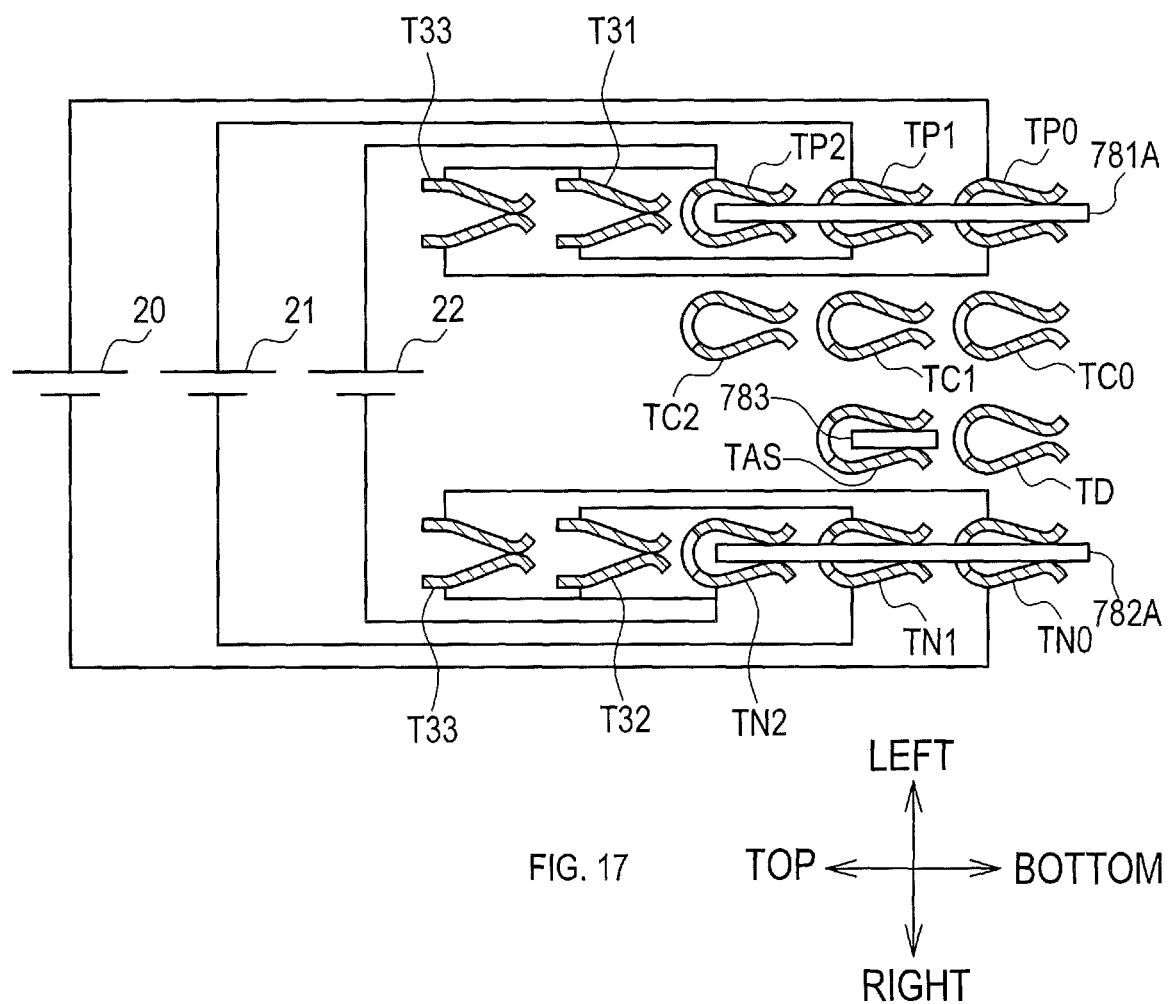
FIG. 17 is a schematic view showing a state where the attachment portion of the first electric working machine is attached to the terminal portion of the battery pack in the fourth embodiment.

As shown in FIG. 15 and FIG. 17, the fourth tool positive electrode terminal 781A is arranged at a position corresponding to the first insertion slot 11, and inserted into the first insertion slot 11. The fourth tool positive electrode terminal 781A is configured to have a length to penetrate the third positive electrode terminal TP0 and the first positive electrode terminal TP1, and enter between the recessed portions HP of the second positive electrode terminal TP2, but not to penetrate the second positive electrode terminal TP2.

The fourth tool negative electrode terminal 782A is arranged at a position corresponding to the fourth insertion slot 14, and inserted into the fourth insertion slot 14. The fourth tool negative electrode terminal 782A is configured to have a length to penetrate the third negative electrode terminal TN0 and the first negative electrode terminal TN1, and enter between the recessed portions HP of the second negative electrode terminal TN2, but not to penetrate the second negative electrode terminal TN2.

As shown in FIG. 17, when the attachment portion 78A is attached to the terminal portion 15A, the fourth tool positive electrode terminal 781A, the third positive electrode terminal TP0, the first positive electrode terminal TP1 and the second positive electrode terminal TP2 are electrically connected. As a result, the tool positive electrode input terminal 75 is connected to positive electrodes of the battery blocks 20, 21, 22. Also, the fourth tool negative electrode terminal 782A is electrically connected to the third negative electrode terminal TN0, the first negative electrode terminal TN1 and the second negative electrode terminal TN2. As a result, the tool negative electrode input terminal 76 is connected to the negative electrodes of the battery blocks 20, 21, 22.

Accordingly, when the attachment portion 78A is attached to the terminal portion 15A, the battery blocks 20, 21, 22 are connected in parallel, and the first voltage, the second voltage, and the third voltage of the battery blocks 20, 21, 22, which are connected in parallel, is output from the terminal portion 15A of the battery pack 10A to the first electric working machine 70A. The first voltage, the second voltage, and the third voltage have approximately same value. The first voltage, the second voltage, and the third voltage of the battery blocks 20, 21, 22, which are connected in parallel, is input between the tool positive electrode input terminal 75 and the tool negative electrode input terminal 76 of the first electric working machine 70A.

In the present embodiment, the fourth tool positive electrode terminal 781A and the fourth tool negative electrode terminal 782A correspond to one example of a first connection terminal in the present disclosure.

<4-2. Configuration of Second Electric Working Machine>

A description will be given of a configuration of the second electric working machine 80C according to the fourth embodiment focusing mainly on differences from the second electric working machine 80. The second electric working machine 80C includes an attachment portion 84C different from the attachment portion 84 of the second electric working machine 80. The attachment portion 84C is attached to the terminal portion 15A of the battery pack 10A.

Figure 18:
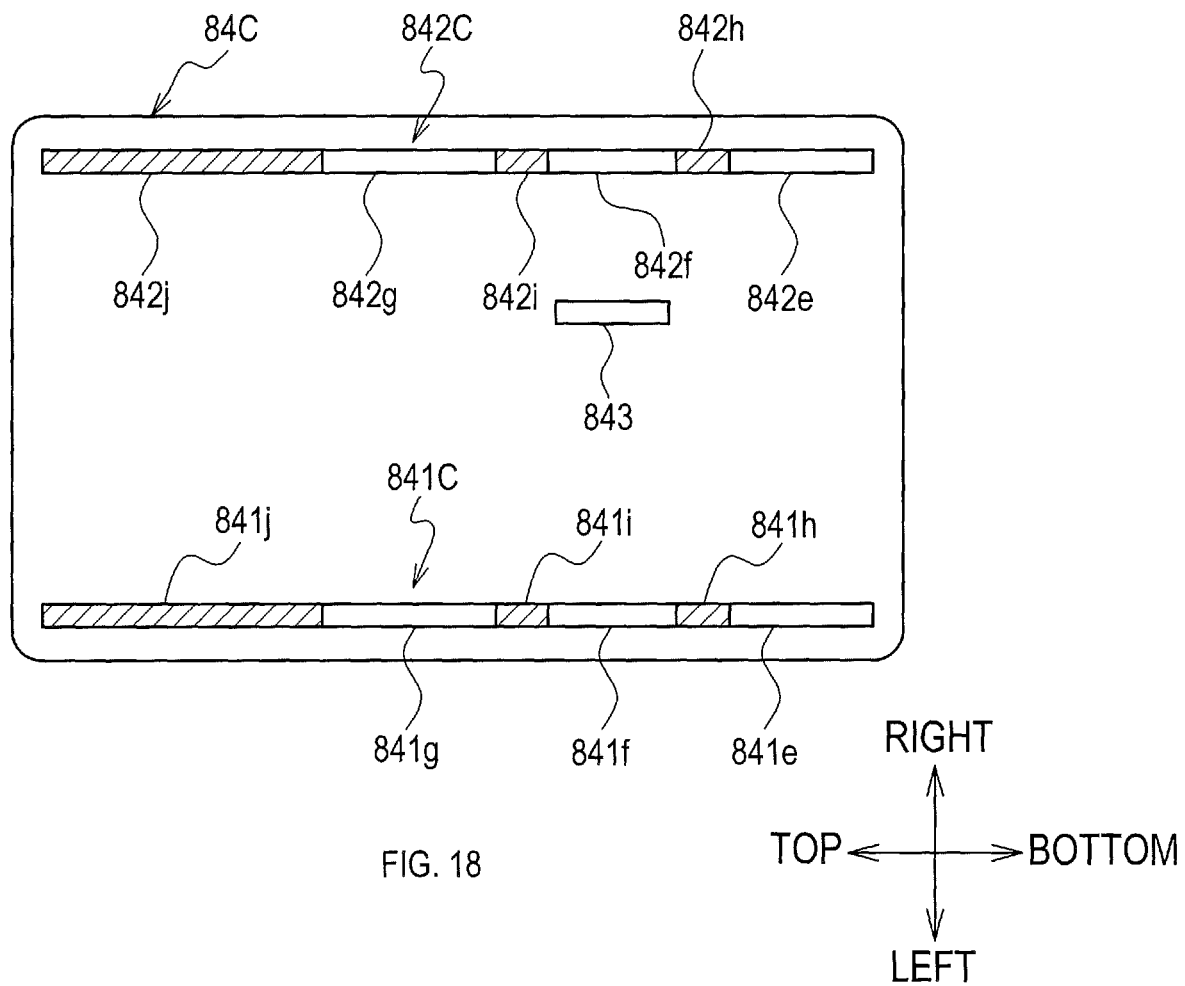
FIG. 18 is a schematic view showing a configuration of an attachment portion of a second electric working machine in the fourth embodiment.

As shown in FIG. 18, the attachment portion 84C includes a fifth tool positive electrode terminal 841C and a fifth tool negative electrode terminal 842C instead of the second tool positive electrode terminal 841 and the second tool negative electrode terminal 842 of the attachment portion 84. The fifth tool positive electrode terminal 841C includes a first positive electrode conduction portion 841e, a second positive electrode conduction portion 841f, and a third positive electrode conduction portion 841g, and a first positive electrode insulated portion 841h, a second positive electrode insulated portion 841i, and a third positive electrode insulated portion 841j. The fifth tool negative electrode terminal 842C includes a first negative electrode conduction portion 842e, a second negative electrode conduction portion 842f, and a third negative electrode conduction portion 842g, and a first negative electrode insulated portion 842h, a second negative electrode insulated portion 842i, and a third negative electrode insulated portion 842j.

Figure 19:
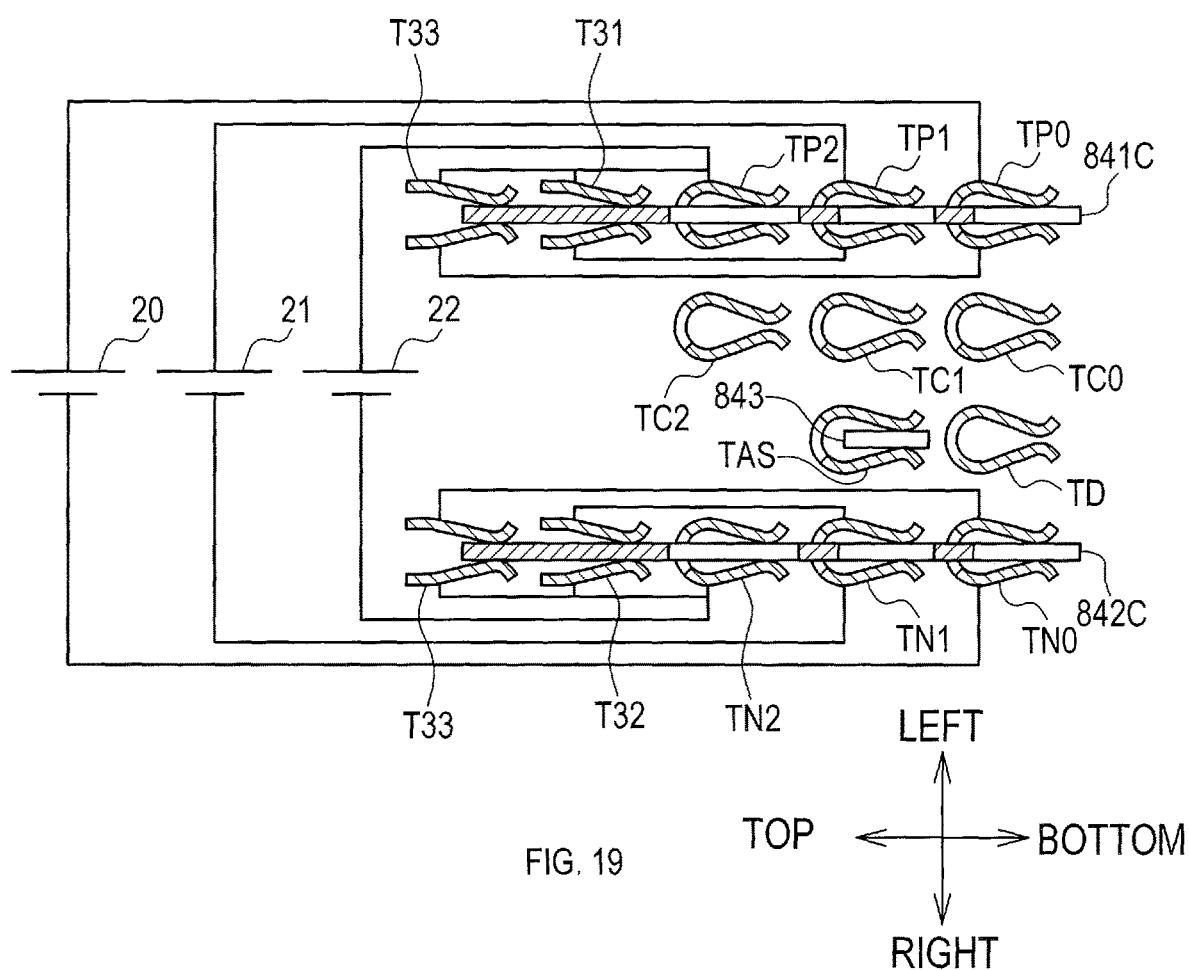
FIG. 19 is a schematic view showing a state where the attachment portion of the second electric working machine is attached to the terminal portion of the battery pack in the fourth embodiment.

As shown in FIG. 15 and FIG. 19, the first positive electrode conduction portion 841e, the second positive electrode conduction portion 841f, and third positive electrode conduction portion 841g are respectively arranged at a position corresponding to the third positive electrode terminal TP0, the first positive electrode terminal TP1, the recessed portion HP of the second positive electrode terminal TP2. The first positive electrode insulated portion 841h, the second positive electrode insulated portion 841i, the third positive electrode insulated portion 841j are respectively arranged at a position corresponding to a slot UP on an upper side of the third positive electrode terminal TP0, a slot UP on an upper side of the first positive electrode terminal TP1, and the recessed portions LHP, RHP of the first and third parallel connection terminals T31, T33.

The first negative electrode conduction portion 842e, the second negative electrode conduction portion 842f, and the third negative electrode conduction portion 842g are respectively arranged at a position corresponding to the third negative electrode terminal TN0, the first negative electrode terminal TN1, the recessed portion HP of the second negative electrode terminal TN2. The first negative electrode insulated portion 842h, the second negative electrode insulated portion 842i, and the third negative electrode insulated portion 842j are respectively arranged at a position corresponding to a slot UP on an upper side of the third negative electrode terminal TN0, a slot UP on an upper side of the first negative electrode terminal TN1, the recessed portions LHP, RHP of the second parallel connection terminals T32, T34.

Thus, when the attachment portion 84C is attached to the terminal portion 15A, the first positive electrode conduction portion 841e and the third positive electrode terminal TP0 are electrically connected, the second positive electrode conduction portion 841f and the first positive electrode terminal TP1 are electrically connected, and the third positive electrode conduction portion 841g and the second positive electrode terminal TP2 are electrically connected. The third positive electrode terminal TP0, the first positive electrode terminal TP1, and the second positive electrode terminal TP2 are electrically disconnected from each other by the first positive electrode insulated portion 841h and the second positive electrode insulated portion 841i, The first member T31a and the second member T31b of the first parallel connection terminal T31, and the first member T33a and the second member T33b of the third parallel connection terminal T33 are electrically disconnected by the third positive electrode insulated portion 841j.

The first negative electrode conduction portion 842e and the third negative electrode terminal TN0 are electrically connected, the second negative electrode conduction portion 842f and the first negative electrode terminal TN1 are electrically connected, and the third negative electrode conduction portion 842g and the second negative electrode terminal TN2 are electrically connected. The third negative electrode terminal TN0, the first negative electrode terminal TN1, and the second negative electrode terminal TN2 are electrically disconnected from each other by the first negative electrode insulated portion 842h and the second negative electrode insulated portion 842i. The first member T32a and the second member T32b of the second parallel connection terminal T32, and the first member T34a and the second member T34b of the fourth parallel connection terminal T34 are electrically disconnected by the third negative electrode insulated portion 842j.

Accordingly, when the attachment portion 84C is attached to the terminal portion 15A, the battery blocks 20, 21, 22 are disconnected and independent from each other, and each of the first voltage of the battery block 20, the second voltage of the battery block 21, and the third voltage of the battery block 22 is independently output from the terminal portion 15A of the battery pack 10A to the second electric working machine 80C. The second electric working machine 80C can add and use the output voltages of the battery blocks 20, 21, 22.

In the present embodiment, the fifth tool positive electrode terminal 841C and the fifth tool negative electrode terminal 842C correspond to one example of a second connection terminal.

<4-3. Configuration of Charger>

A description will be given of a configuration of a charger 90A according to the fourth embodiment focusing mainly on differences from the charger 90. The charger 90A includes an attachment portion 96A different from the attachment portion 96 of the charger 90. The attachment portion 96A is connected to the terminal portion 15A of the battery pack 10A.

Figure 20:
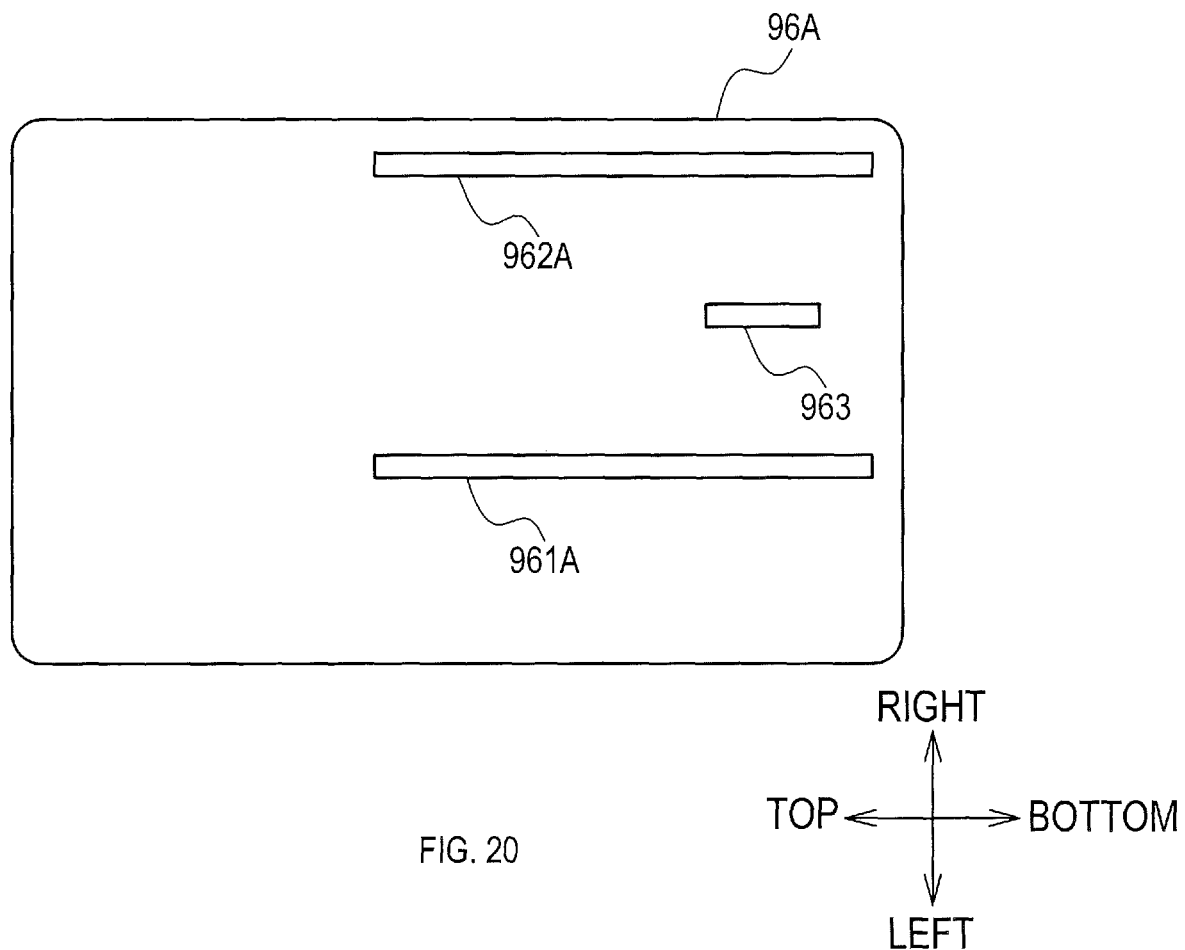
FIG. 20 is a block diagram showing a configuration of an attachment portion of a charger in the fourth embodiment.

As shown in FIG. 15 and FIG. 20, the attachment portion 96A includes a second charger positive electrode terminal 961A and a second charger negative electrode terminal 962A instead of the first charger positive electrode terminal 961 and the first charger negative electrode terminal 962 of the attachment portion 96.

The second charger positive electrode terminal 961A is arranged at a position corresponding to the second insertion slot 12, and inserted into the second insertion slot 12. The second charger positive electrode terminal 961A is configured to have a length to penetrate the third charging terminal TC0 and the first charging terminal TC1, enter between the recessed portions HP of the second charging terminal TC2, but not to penetrate the second charging terminal TC2.

The second charger negative electrode terminal 962A is arranged at a position corresponding to the fourth insertion slot 14, and inserted into the fourth insertion slot 14. The second charger negative electrode terminal 962A is configured to be similar to the fourth tool negative electrode terminal 782A of the first electric working machine 70A.

When the attachment portion 96A is attached to the terminal portion 15A, the second charger positive electrode terminal 961A and the third charging terminal TC0, the first charging terminal TC1 and the second charging terminal TC2 are electrically connected. As a result, the charging circuit positive electrode terminal 93 is connected to the positive electrodes of the battery blocks 20, 21, 22. Also, the second charger negative electrode terminal 962A, the third negative electrode terminal TN0, the first negative electrode terminal TN1 and the second negative electrode terminal TN2 are electrically connected. As a result, the charging circuit negative electrode terminal 94 is connected to the negative electrodes of the battery blocks 20, 21, 22. Thus, the battery blocks 20, 21, 22 are charged in a state of being connected in parallel.

<4-4. Effects>

According to the fourth embodiment as described above, the effects from (1) to (10) of the first embodiment can be achieved. By using the battery pack 10A including the three battery blocks 20, 21, 22, it is possible to use the second electric working machine 80C adapted to a higher voltage. In addition, similar to the fourth embodiment, battery packs including four or more battery blocks may be used.

Other Embodiments

Although some example embodiments to implement the present disclosure have been described, the present disclosure is not limited to the above-described embodiments, but may be implemented in various forms.

(a) In the aforementioned embodiments, the first, second, and third battery circuits 210, 220, 200 respectively include the semiconducting resistors 511, 512, 510. However, it may be possible not to include the semiconducting resistors 511, 512, 510. Alternatively, while the battery packs 10, 10A are stored, the discharge reverse flow prevention FETs 531, 532, 530 may be in a half-ON state by adjusting a voltage applied between a source terminal and a drain terminal of each of the discharge reverse flow prevention FETs 531, 532, 530. With the discharge reverse flow prevention FETs 531, 532, 530 being in the half-ON state, a semiconducting state can be brought between the first positive electrode terminal TP1 and the positive electrode of the battery block 21, between the second positive electrode terminal TP2 and the positive electrode of the battery block 22, and between and the third positive electrode terminal TP0 and the positive electrode of the battery block 20.

(b) A plurality of functions performed by a single element in the aforementioned embodiments may be achieved by a plurality of elements, or a function performed by a single element may be achieved by a plurality of elements. Also, a plurality of functions performed by a plurality of elements may be achieved by a single element, or a function performed by a plurality of elements may be achieved by a single element. A part of the configurations in the above embodiments may be omitted. Moreover, at least a part of a configuration in the aforementioned embodiments may be added to, or may replace, another configuration in the aforementioned embodiments.

What is claimed is:
1. A battery pack comprising:
a first battery including:
  a first positive electrode,
  a first negative electrode, and
  a first battery voltage defined between the first positive electrode and the first negative electrode;
a second battery including:
  a second positive electrode,
  a second negative electrode, and
  a second battery voltage defined between the second positive electrode and the second negative electrode;
a first positive electrode terminal electrically connected to the first positive electrode and configured to slidingly receive an external positive terminal;
a second positive electrode terminal electrically connected to the second positive electrode and configured to slidingly receive the external positive terminal;
a positive parallel connection terminal configured to slidingly receive the external positive terminal and including:
  a second positive member electrically connected to the second positive electrode; and
  a first positive member electrically connected to the first positive electrode terminal, and configured to physically contact the second positive member when in a positive default position and NOT physically contact the second positive member when in a positive separated position, the positive default position corresponding to a position where the first positive electrode terminal, the second positive electrode terminal, and the positive parallel connection terminal do NOT receive the external positive terminal;
a first negative electrode terminal electrically connected to the first negative electrode and configured to slidingly receive an external negative terminal;
a second negative electrode terminal electrically connected to the second negative electrode and configured to slidingly receive the external negative terminal; and
a negative parallel connection terminal configured to slidingly receive the external negative terminal and including:
  a second negative member electrically connected to the second negative electrode; and
  a first negative member electrically connected to the first negative electrode terminal, and configured to physically contact the second negative member when in a negative default position and NOT physically contact the second negative member when in a negative separated position, the negative default position corresponding to a position where the first negative electrode terminal, the second negative electrode terminal, and the negative parallel connection terminal do NOT receive the external negative terminal.

2. The battery pack of claim 1, wherein:
the external positive terminal includes a first tool positive electrode terminal,
the external negative terminal includes a first tool negative electrode terminal,
in response to (i) the first positive electrode terminal and the second positive electrode terminal receiving the first tool positive electrode terminal, and (ii) the positive parallel connection terminal NOT receiving the first tool positive electrode terminal, the first positive electrode terminal, the second positive electrode terminal, and the positive parallel connection terminal are configured to be placed into a first tool positive attached position such that:
  the first tool positive electrode terminal physically contacts the first positive electrode terminal and the second positive electrode terminal,
  the first tool positive electrode terminal electrically connects the first positive electrode terminal to the second positive electrode terminal, and
  the first tool positive electrode terminal does NOT physically contact the positive parallel connection terminal; and
in response to (i) the first negative electrode terminal and the second negative electrode terminal receiving the first tool negative electrode terminal, and (ii) the negative parallel connection terminal NOT receiving the first tool negative electrode terminal, the first negative electrode terminal, the second negative electrode terminal, and the negative parallel connection terminal are configured to be placed into a first tool negative attached position such that:
  the first tool negative electrode terminal physically contacts the first negative electrode terminal and the second negative electrode terminal,
  the first tool negative electrode terminal electrically connects the first negative electrode terminal to the second negative electrode terminal, and
  the first tool negative electrode terminal does NOT physically contact the negative parallel connection terminal.

3. The battery pack of claim 1, wherein:
the external positive terminal includes a second tool positive electrode terminal,
the external negative terminal includes a second tool negative electrode terminal,
the first positive electrode terminal, the second positive electrode terminal, and the positive parallel connection terminal are configured to receive the second tool positive electrode terminal into a second tool positive attached position;
the second tool positive electrode terminal includes:
  a first positive electrode conduction portion,
  a first positive electrode insulation portion,
  a second positive electrode conduction portion, and
  a second positive electrode insulation portion;
the first negative electrode terminal, the second negative electrode terminal, and the negative parallel connection terminal are configured to slidingly receive the second tool negative electrode terminal into a second tool negative attached position;
the second tool negative electrode terminal includes:
  a first negative electrode conduction portion,
  a first negative electrode insulation portion,
  a second negative electrode conduction portion, and
  a second negative electrode insulation portion.

4. The battery pack of claim 3:
wherein when the second tool positive electrode terminal is in the second tool positive attached position, then:
  the first positive electrode conduction portion contacts the first positive electrode terminal,
  the first positive electrode insulation portion insulates the first positive electrode conduction portion from the second positive electrode conduction portion,
  the second positive electrode conduction portion contacts the second positive electrode terminal, and
  the second positive electrode insulation portion physically separates the first positive member from the second positive member; and
wherein when the second tool negative electrode terminal is in the second tool negative attached position, then:
  the first negative electrode conduction portion contacts the first negative electrode terminal,
  the first negative electrode insulation portion insulates the first negative electrode conduction portion from the second negative electrode conduction portion,
  the second negative electrode conduction portion contacts the second negative electrode terminal, and
  the second negative electrode insulation portion physically separates the first negative member from the second negative member.

5. A battery pack comprising:
a first battery block configured to output a first voltage;
a second battery block configured to output a second voltage; and
a terminal portion configured to be interchangeably connected to a first electric working machine or a second electric working machine,
the terminal portion including:
a parallel connection terminal configured to connect the first battery block to the second battery block in parallel, the parallel connection terminal being configured to electrically disconnect the first battery block from the second battery block;
a first output terminal connected to the first battery block; and
a second output terminal connected to the second battery block, the first electric working machine being adapted to a first machine voltage, and the first electric working machine including a first connection terminal configured to be connected to the first output terminal and/or the second output terminal, the second electric working machine being adapted to a second machine voltage higher than the first machine voltage, and the second electric working machine including a second connection terminal configured to be connected to both the first output terminal and the second output terminal, and the first output terminal connected to the second connection terminal being electrically disconnected from the second output terminal connected to the second connection terminal, the parallel connection terminal being configured to connect the first battery block to the second battery block in parallel in response to a state where the first electric working machine is connected to the terminal portion, or a state where nothing is connected to the terminal portion, the parallel connection terminal being configured to electrically disconnect the first battery block from the second battery block in response to a state where the second electric working machine is connected to the terminal portion, the terminal portion being configured to output a parallel voltage of the battery block and the second battery block connected in parallel in response to the state where the first electric working machine is connected to the terminal portion, and the terminal portion being configured to output the first voltage of the first battery block and the second voltage of the second battery block individually in response to the state where the second electric working machine is connected to the terminal portion.

6. The battery pack according to claim 5,
wherein the parallel connection terminal includes a first member and a second member,
wherein each of the first battery block and the second battery block includes a first electrode and a second electrode,
wherein the first member is configured to be connected to and disconnected from the second member,
wherein the first member is configured to be connected to the first electrode of the first battery block, and
wherein the second member is configured to be connected to the first electrode of the second battery block.

7. The battery pack according to claim 5,
wherein each of the first battery block and the second battery block includes a first electrode and a second electrode, and
wherein the parallel connection terminal includes:
a first parallel connection terminal configured to be connected to both the first electrode of the first battery block and the first electrode of the second battery block; and
a second parallel connection terminal configured to be connected to both the second electrode of the first battery block and the second electrode of the second battery block.

8. The battery pack according to claim 7,
wherein each of the first parallel connection terminal and the second parallel connection terminal includes a first member and a second member,
wherein the first member is configured to be connected to and disconnected from the second member, wherein the first member of the first parallel connection terminal is configured to be connected to the first electrode of the first battery block,
wherein the second member of the first parallel connection terminal is configured to be connected to the first electrode of the second battery block,
wherein the first member of the second parallel connection terminal is configured to be connected to the second electrode of the first battery block, and
wherein the second member of the second parallel connection terminal is configured to be connected to the second electrode of the second battery block.

9. The battery pack according to claim 5,
wherein the parallel connection terminal is configured to connect the first battery block to the second battery block in parallel while the battery pack is charged.

10. The battery pack according to claim 5 further comprising:
a communication terminal; and
a single controller configured to collect a first battery information and a second battery information, the single controller being configured to transmit the first battery information and the second battery information via the communication terminal, the first battery information being information about the first battery block, the second battery information being information about the second battery block.

11. The battery pack according to claim 5,
wherein each of the first battery block and the second battery block includes a positive electrode,
wherein the battery pack includes:
a first positive electrode line connected between the positive electrode of the first battery block and the first output terminal;
a second positive electrode line connected between the positive electrode of the second battery block and the second output terminal; and
a switcher provided on each of the first positive electrode line and the second positive electrode line, the switcher being configured to set the first positive electrode line and the second positive electrode line to a semiconducting state in response to the state where nothing is connected to the terminal portion,
wherein the semiconducting state is an intermediate state between an interrupted state and a conducting state, and in the semiconducting state, less electric current is allowed to flow than electric current allowed to flow in the conducting state,
wherein in the interrupted state, electric current is interrupted between the positive electrode of the first battery block and the first output terminal, and electric current is interrupted between the positive electrode of the second battery block and the second output terminal, and
wherein in the conducting state, electric current is allowed to flow between the positive electrode of the first battery block and the first output terminal, and the electric current is allowed to flow between the positive electrode of the second battery block and the second output terminal.

12. The battery pack according to claim 10 further comprising;
a first battery circuit connected to the first battery block, the first battery circuit including the first output terminal and a photocoupler; and a second battery circuit connected to the second battery block, the second battery circuit including the second output terminal, the communication terminal, and the single controller, wherein the first battery information is transmitted to the single controller via the photocoupler.

13. The battery pack according to claim 12 further comprising:
a first detection circuit provided in the first battery circuit, the first detection circuit being configured to detect the first battery information;
a second detection circuit provided in the second battery circuit, the second detection circuit being configured to detect the second battery information,
wherein the first detection circuit is configured to output the first battery information to the single controller via the photocoupler.

14. A battery system comprising:
a first electric working machine adapted to a first machine voltage;
a second electric working machine adapted to a second machine voltage higher than the first machine voltage; and
a battery pack, the battery pack including:
a first battery block configured to output a first voltage;
a second battery block configured to output a second voltage; and
a terminal portion configured to be interchangeably connected to the first electric working machine or the second electric working machine, the terminal portion including:
a parallel connection terminal configured to connect the first battery block to the second battery block in parallel, the parallel connection terminal being configured to electrically disconnect the first battery block from the second battery block;
a first output terminal connected to the first battery block; and
a second output terminal connected to the second battery block,
the first electric working machine including a first connection terminal configured to be connected to the first output terminal and/or the second output terminal,
the second electric working machine including a second connection terminal configured to be connected to both the first output terminal and the second output terminal, and the first output terminal connected to the second connection terminal being electrically disconnected from the second output terminal connected to the second connection terminal,
the parallel connection terminal being configured to connect the first battery block to the second battery block in parallel in response to a state where the first electric working machine is connected to the terminal portion, or a state where nothing is connected to the terminal portion,
the parallel connection terminal being configured to electrically disconnect the first battery block from the second battery block in response to a state where the second electric working machine is connected to the terminal portion,
the terminal portion being configured to output a parallel voltage of the battery block and the second battery block connected in parallel in response to the state where the first electric working machine is connected to the terminal portion, and
the terminal portion being configured to output the first voltage of the first battery block and the second voltage of the second battery block individually in response to the state where the second electric working machine is connected to the terminal portion.

15. The battery system according to claim 14,
wherein the second electric working machine includes:
an adder circuit configured to add the first voltage of the first battery block and the second voltage of the second battery block input via the second connection terminal.

16. The battery system according to claim 14,
wherein the second electric working machine includes:
an adapter portion including the second connection terminal and an adapter side terminal; and
a main body including a body side terminal, the body side terminal being configured to be connected to the adapter side terminal.

17. The battery system according to claim 16,
wherein the adapter portion includes an adder circuit configured to add the first voltage of the first battery block and the second voltage of the second battery block input via the second connection terminal.

18. The battery system according to claim 14,
wherein the first output terminal and the second output terminal are arranged in a line,
wherein the second connection terminal is formed into a plate shape, and the second connection terminal includes a first conduction area configured to physically come in contact with the first output terminal, a second conduction area configured to physically come in contact with the second output terminal, and an insulation area arranged between the first conduction area and the second conduction area.

* * * * *